United States Patent
Choi et al.

(10) Patent No.: US 11,976,181 B2
(45) Date of Patent: May 7, 2024

(54) HYDROGENATED NITRILE RUBBER WITH REDUCED CATALYST IMPURITY

(71) Applicant: Zeon Chemicals L.P., Louisville, KY (US)

(72) Inventors: Soobum Choi, Louisville, KY (US); Lawrence J. Justice, Louisville, KY (US); Mahesh Datla, Friendswood, TX (US)

(73) Assignee: ZEON CHEMICALS L.P., Louisville, KY (US)

( * ) Notice: Subject to any disclaimer, the term of this patent is extended or adjusted under 35 U.S.C. 154(b) by 205 days.

(21) Appl. No.: 17/568,947

(22) Filed: Jan. 5, 2022

(65) Prior Publication Data

US 2022/0220289 A1 Jul. 14, 2022

Related U.S. Application Data

(60) Provisional application No. 63/134,980, filed on Jan. 8, 2021.

(51) Int. Cl.
| | |
|---|---|
| *C08C 19/02* | (2006.01) |
| *B01J 23/44* | (2006.01) |
| *B01J 38/74* | (2006.01) |
| *B01J 47/02* | (2017.01) |
| *C08L 15/00* | (2006.01) |

(52) U.S. Cl.
CPC ............. *C08L 15/005* (2013.01); *B01J 23/44* (2013.01); *B01J 38/74* (2013.01); *B01J 47/02* (2013.01); *C08C 19/02* (2013.01)

(58) Field of Classification Search
CPC ... C08C 2/04; C08C 1/04; C08C 19/02; C08F 6/02; C08F 236/12; C08F 8/04
See application file for complete search history.

(56) References Cited

U.S. PATENT DOCUMENTS

| | | | |
|---|---|---|---|
| 5,403,566 A | 4/1995 | Panster et al. | |
| 2009/0163640 A1* | 6/2009 | Ong | ...................... C08L 15/005 524/440 |

FOREIGN PATENT DOCUMENTS

| | | | | |
|---|---|---|---|---|
| WO | WO-2017222514 A1 * | 12/2007 | ............... | B01J 38/52 |
| WO | WO-2013098056 A1 * | 7/2013 | ............... | C08C 2/02 |

* cited by examiner

*Primary Examiner* — Robert C Boyle
(74) *Attorney, Agent, or Firm* — BakerHostetler

(57) ABSTRACT

The residual hydrogenation catalyst from the hydrogenated nitrile rubber solution is recovered by using two steps such as (1) the catalyst extraction step with an ammonium salt and water (optionally including an oxidation step) to extract catalyst from the HNBR polymer chain to the solvent and then (2) the separation/column recovery step with the column packed with functional ion exchange resins for the separation of ammonia-catalyst complex from hydrogenated nitrile rubber solution and the column recovery for the high catalyst recovery with functional groups of resins. The ammonium salt for the catalyst extraction step is selected from ammonium chloride, ammonium bromide, ammonium iodide, and ammonium acetate. The functional groups in the functional ion exchange resins for packing the column is selected from thiourea, thiouronium, thiol, amine, diamine, triamine, TMT, dithiocarbamate, and carbodithioate.

32 Claims, 6 Drawing Sheets

HYDROGENATED NITRILE RUBBER WITH REDUCED CATALYST IMPURITY

CROSS REFERENCE TO RELATED APPLICATIONS

The present application hereby claims the benefit of the provisional patent application of the same title, Ser. No. 63/134,980, filed on Jan. 8, 2021, the disclosure of which is herein incorporated by reference in its entirety.

BACKGROUND

This disclosure relates to a method for recovery of residual catalyst from hydrogenated nitrile rubber solution.

Acrylonitrile-butadiene copolymer (NBR) is used broadly in the rubber industry, but it's use is limited by heat resistance, oil resistance, and weather resistance. To improve NBR, it is hydrogenated in an organic solvent with a homogeneous catalyst, such as a Rh catalyst, or a heterogeneous catalyst, such as a silica supported palladium catalyst. The partially or highly saturated acrylonitrile-butadiene copolymer or the hydrogenated nitrile rubber is called HNBR.

After hydrogenation of NBR with a homogeneous or heterogeneous catalyst in an organic solvent, there are a few problems with the residual catalyst in the HNBR. The first is the high price of catalyst compared to the HNBR price. The second is the adverse properties such as dark color and degradation initiated by heat or light. The third is limited amounts of transition metals in the earth. The last are possibly environmental issues.

BRIEF SUMMARY

The recovery process of the residual hydrogenation catalyst from the hydrogenated nitrile rubber solution comprised the steps of (1) a catalyst extraction step with an ammonium salt and water (optionally including an oxidation step) to extract catalyst from the HNBR polymer chain to the solvent and then (2) the separation/column recovery step with the column packed with functional ion exchange resins without suffering from the pressure drop for the separation of ammonia-catalyst complex from hydrogenated nitrile rubber solution.

The ammonium salt for the catalyst extraction step is selected from ammonium chloride, ammonium bromide, ammonium iodide and ammonium acetate.

The functional groups in the functional ion exchange resins for packing the column is selected from thiourea, thiouronium, thiol, amine, diamine, triamine, trimercaptotriazine (TMT), dithiocarbamate, and carbodithioate.

This recovery method of hydrogenation catalyst residue from hydrogenated nitrile rubber solution offers an economic and practical process having the low residual catalyst in the hydrogenated nitrile rubber using two steps such as (1) a catalyst extraction step with an ammonium salt and water (optionally including an oxidation step) and then (2) the separation/column recovery step with the column packed with functional ion exchange resins. The process has overcome the problem of impurities in the hydrogenated nitrile rubber and the problem of the high cost for the recovery of residual hydrogenation catalyst from several regenerations of the used ion exchange resins because of the limited functional groups on the surface of ion exchange resins.

These and other objects and advantages shall be made apparent from the accompanying drawings and the description thereof.

BRIEF DESCRIPTION OF THE FIGURES

The accompanying drawings, which are incorporated in and constitute a part of this specification, illustrate embodiments, and together with the general description given above, and the detailed description of the embodiments given below, serve to explain the principles of the present disclosure.

DETAILED DESCRIPTION

Figure 1:
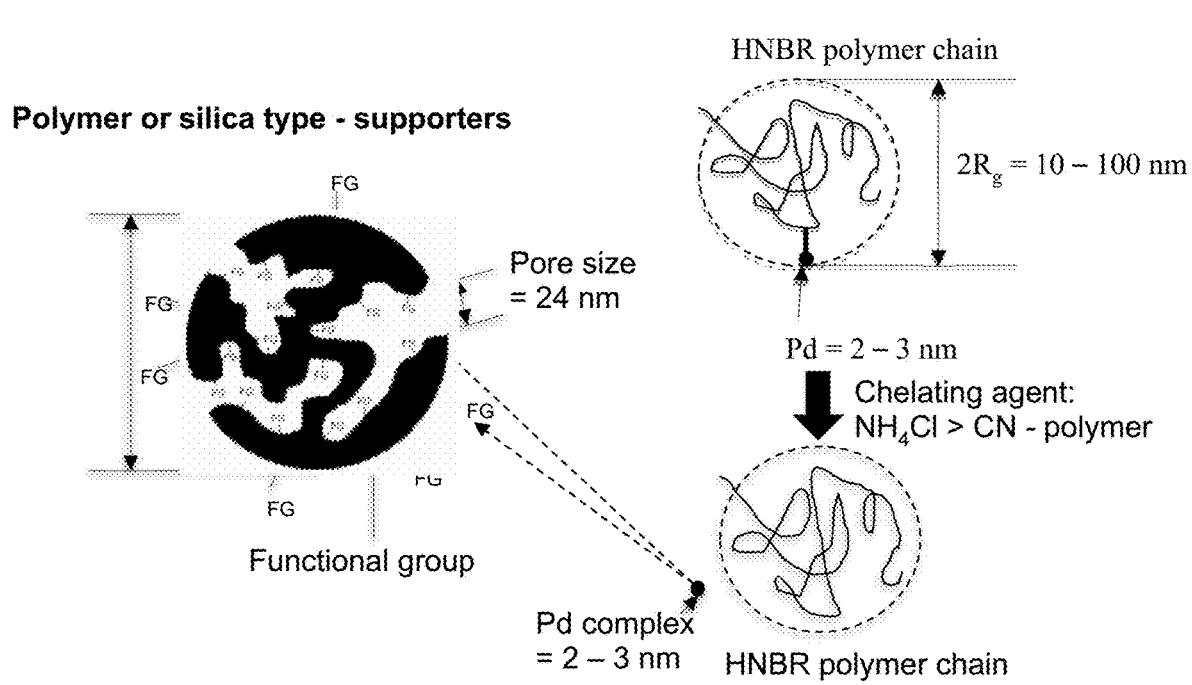
FIG. 1 is a picture of the concept of catalyst extraction from polymer chain with chelating agent and the column recovery packed ion-exchange resins.

The present inventors worked to solve the problems described above, i.e., high catalyst recovery from the hydrogenated nitrile rubber solution without contaminating impurities in the polymer with two steps such as a catalyst extraction step with an ammonium salt and water from the HNBR polymer chain and then a separation/column recovery step with a column packed with functional ion exchange resins without suffering from pressure drop, and with high efficiency of the catalyst recovery without regeneration of the used resins which are more than 75% of the resin efficiency.

The recovery process of the residual hydrogenation catalyst from hydrogenated nitrile rubber solution comprised the steps of (1) a catalyst extraction step with an ammonium salt and water (optionally including an oxidation step) to extract catalyst from the HNBR polymer chain to the solvent and then (2) a separation/column recovery step with the column packed with functional ion exchange resins without suffering from a pressure drop for the separation of ammonia-catalyst complex from hydrogenated nitrile rubber solution. The resulting HNBR has less than 50 ppm residual catalysts by weight of HNBR. Residual catalyst (Pd) is determined by using ICP (Inductively Coupled Plasma Argon Emission Spectroscopy) on the solid polymer.

Catalyst extraction efficiency from the HNBR polymer chain for the catalyst extraction step (1) may be affected by the amount of ammonium salt, water, the extraction temperature, and the extraction time. Factors include the hydrogenated nitrile rubber solution state such as oxidation degree, viscosity, and catalyst amount for the effective extraction of the catalyst with a form of ammonia-catalyst complex from hydrogenated nitrile rubber in solution. The hydrogenated nitrile rubber solution state in the catalyst extraction step (1) is controlled by using oxidation degree, extraction temperature, extraction time, and solid content of HNBR solution.

Acrylonitrile-butadiene copolymer (NBR) may be hydrogenated using a heterogeneous or homogeneous catalyst in the presence of a hydrogen source. In some embodiments, the catalyst is a heterogeneous catalyst, which is where the catalyst has a different phase than that of the reactants and may be on a solid support. Examples include catalysts that comprise ruthenium, rhodium, palladium, osmium, iridium, and platinum. In some embodiments, the heterogeneous catalyst is selected from $Pd/SiO_2$, $Pd/Al_2O_3$, $Pd/TiO_2$, $Pd/CeO_2$, and $Pd/ZrO_2$. In some embodiments, the heterogeneous catalyst comprises palladium or platinum. In some embodiments, the heterogeneous catalyst comprises palladium. In some embodiments, the catalyst is a homogeneous catalyst, which is in the same phase as the reactants. Examples include catalysts that comprise rhodium, iridium, and nickel, such as Wilkinson's catalyst, Lindlar catalyst, and Raney nickel.

Acrylonitrile-butadiene copolymer (NBR) is hydrogenated to form hydrogenated nitrile rubber (HNBR). The saturation level (Iodine Value) of the HNBR is reduced to less than 45 mg/100 mg. In some embodiments, the Iodine Value (IV) is less than 40 mg/100 mg, such as less than 35 mg/100 mg, 30 mg/100 mg, 20 mg/100 mg, and 10 mg/100 mg. The Wijs procedure is used for determining the unsaturation (Iodine Value) in Hydrogenated Nitrile Rubber (HNBR) by the addition of iodine monochloride. This test method measures the unsaturation as iodine value by addition of an iodine/chlorine reagent. The amount of reagent absorbed is determinate by back titrating the excess reagent and comparing it to a blank determination. Iodine values are reported in centigrams of iodine per gram of HNBR [cg (12)/g]. Higher iodine values indicate higher levels of unsaturation. This test method is appropriate for calculating the percent residual unsaturation of hydrogenated nitrile rubber if the iodine value of the base polymer before hydrogenation has been determined.

In some embodiments, the hydrogenation catalyst residue recovery process from hydrogenated nitrile rubber solution is able to obtain over 80% of the residual catalyst from highly saturated hydrogenated nitrile rubber using the extraction step of removing the catalyst from the HNBR polymer chain and then the separation step of a chelating agent-catalyst complex from hydrogenated nitrile rubber solution. This process overcomes the problem of having impurities in hydrogenated nitrile rubber, the commercial problem of the separation of the chelating agent-catalyst complexes from the catalyst extracted solvent-hydrogenated nitrile rubber solution, and the problem of the high cost of regeneration of the used resins for recovery of residual hydrogenation catalyst from hydrogenated nitrile rubber solution.

Hydrogenated nitrile rubber solution can be prepared with heterogeneous catalyst or homogeneous catalyst in a solution under hydrogenation atmosphere. The reaction of the hydrogenation of nitrile rubber in solution results in a reduction of at least 80% of the original carbon-carbon double bonds contained in an unsaturated nitrile rubber. The nitrile rubber content in the solution is typically 2-50% depending on the catalyst type, the mixing efficiency, and the target saturation degree. The catalyst used for the hydrogenation of the nitrile rubber is either a homogeneous or heterogeneous catalyst. Hydrogenated nitrile rubber solution is included in hydrogenated acrylonitrile-butadiene copolymer solution, hydrogenated acrylonitrile-acrylate-butadiene terpolymer solution, and hydrogenated acrylonitrile-butadiene-methacrylic acid terpolymer solution. When the heterogeneous catalyst is used in solution, some of catalyst may be separated by using filtration or centrifugation before.

Catalyst Extraction Step

The catalyst extraction step is the formation of an ammonia-catalyst complex from the free catalyst in the solution or the fixed catalyst, which is attached to the hydrogenated nitrile rubber, by using an ammonium salts, below 2% by weight of hydrogenated nitrile rubber in the solution which is oxidized before or/and during the catalyst extraction step with an optional oxidizing agent.

The concept of catalyst extraction from polymer chain in HNBR solution was shown in FIG. 1.

In some embodiments, the oxidation state of the hydrogenated nitrile rubber in solution is controlled by the contact of oxygen (air)/nitrogen mixture or oxidizing agents such as Iron (III) chloride, iodine, hydrogen peroxide, copper (II) chloride, copper (II) acetate, benzoquinone, tert-butyl hydroperoxide, manganese dioxide, nitric acid, or sodium chlorate. In some embodiments the oxidizing agents for the hydrogenated nitrile rubber in solution are oxygen (air), iron (III) chloride, copper (II) chloride, benzoquinone, or hydrogen peroxide. Two or three co-oxidizing agents can be used simultaneously to improve the oxidation efficiency. When oxygen was used as the oxidizing agent in this process, the safe oxygen concentration with the nitrogen should be used below 10% by volume which is below the flammability limit. In some embodiments, the oxygen concentration is below 8% by volume, such as below 3% by volume.

The general chemical structure of the ammonium salts for forming the chelation agent-catalyst complex from the hydrogenated nitrile rubber solution state is shown below:

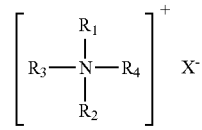

Where R1, R2, R3, and R4 are hydrogen or alkyl and X is an anion. Anion (X) is chloride, bromide, iodide, or acetate. Examples of ammonium salts in the chemical structure are ammonium chloride, ammonium bromide, ammonium iodide, and ammonium acetate. In some embodiments, the ammonium salt is ammonium chloride.

Ammonium salts for the catalyst extraction step can be used alone or a combination of two or three ammonium salts selected from the above ammonium salts. Ammonium salt can be used in the solid state or the solution state, such as in a concentration of less than 25% w/w of ammonium salt in the solution. The amount of ammonium salt for the catalyst extraction step depends on the residual catalyst level in the hydrogenated nitrile rubber, the ammonium salt type, the hydrogenated nitrile rubber content in the solution, the residual metal amount in the solution, the extraction time, the mixing efficiency, the solvent type for the catalyst extraction step, and the hydrogenated nitrile rubber type. The typical amount of ammonium salt used is about 4 moles to 1 mole of the catalyst in the hydrogenated nitrile rubber. In some embodiments, the amount is 5 moles to 1 mole of catalyst, or 6 moles to 1 mole of catalyst, or 10 moles to 1 mole of catalyst. The amount of ammonium salt to be used in the solution is based on the residual catalyst amount, but the efficiency of the ammonium salt depends on the solid content, acrylonitrile content, reaction time, reaction temperature, mixing method, and solvent type. Other residual metals can make a complex with ammonium salt, so they may reduce the efficiency of the catalyst extraction efficiency, requiring more of the ammonium salt.

In the catalyst extraction step, ammonium salt can be added alone or by using the mixture with a solvent such as water, alcohol, methanol, or glycerol. In some embodiments, the solvent is water. A small amount of water with ammonium salt can help the migration of ammonium salt from the solution to the hydrogenated nitrile rubber because ammonium salt has better solubility in water than acetone. The amount of water with ammonium salt should be less than that the amount that would result in a phase separation. If the amount of water with ammonium salt is higher than that where phase separation occurs, the catalyst extracted HNBR solution cannot pass the column packed with functional resins because of the gel formation.

In some embodiments, the amount of the water use in the catalyst extraction step is related to the total solid content (TSC) of the HNBR solution, the composition of the hydrogenated nitrile rubber, and the polymer type of the base nitrile rubber such as copolymer or terpolymer. The typical amount of the water for the catalyst extraction step may be from about 0% to about 5% by weight, such as from about 0.05% to 2% by weight, or from 0.1% to 1.5% by weight, based on the hydrogenated nitrile rubber solution. Below 0.05% by weight of water based on the hydrogenated nitrile rubber solution results in low amounts of extracted catalyst from the hydrogenated nitrile rubber. When water is used in more than 2% by weight based on the hydrogenated nitrile rubber, the polymer separates from the hydrogenated nitrile rubber solution.

In the catalyst extraction step with ammonium salt, hydrogenated nitrile rubber content in the solution is directly related to the extraction efficiency. Suitable hydrogenated nitrile rubber content in the solution is from 1% to 20% by weight, such as from 2% to 16% by weight, and from 4% to 14% by weight. Below 1% of hydrogenated nitrile rubber content is not good for economic process. Above 20% of hydrogenated nitrile rubber content is difficult to mix with ammonium salt and gives a low extraction efficiency.

Another important factor for the mixing efficiency is the mixing method such as shaking or agitation with agitator. Depending on the mixing method, the extraction efficiency can be improved. Agitation with a typical agitator is very effective. High temperature can also affect to the extraction efficiency by increasing the mobility of the polymer chain and reducing the viscosity of the solution, so the ammonium salt can approach to the polymer chain more easily.

In the catalyst extraction step with ammonium salt, the organic solvent for dissolving hydrogenated nitrile rubber may be the same solvent as used in the hydrogenation process of nitrile rubber, or it may be a partially or completely water-miscible solvent. Suitable organic solvents include ketones such as acetone, methyl ethyl ketone, diethyl ketone, and methyl isopropyl ketone; and ethers such as dioxane and tetrahydrofuran, acetone is a particularly preferred organic solvent.

The Separation/Column Recovery Step with the Column Packed with Functional Ionic Exchange Resins After catalyst extraction from the HNBR polymer chain to the solution of ammonium salt and solvent, the separation/column recovery step with a column packed with functional ion exchange resins is required for the separation of ammonia-platinum complex from the hydrogenated nitrile rubber solution. The functional groups of the ion exchange resins used for packing the column are able to bind with platinum-ammonia complex or platinum-ammonium chloride complex as it is passed through the column.

Figure 2:
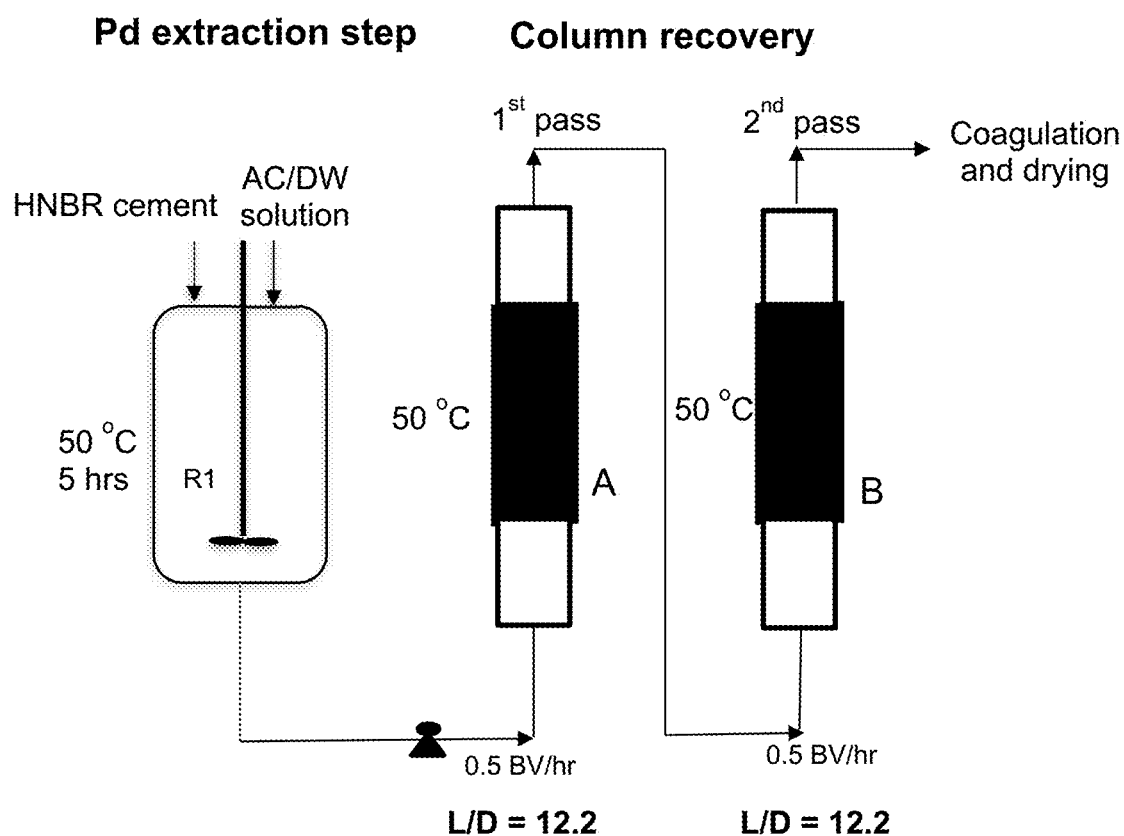
FIG. 2 is a picture of the catalyst extraction step and the column recovery with two columns packed ion-exchange resins.
Figure 3:
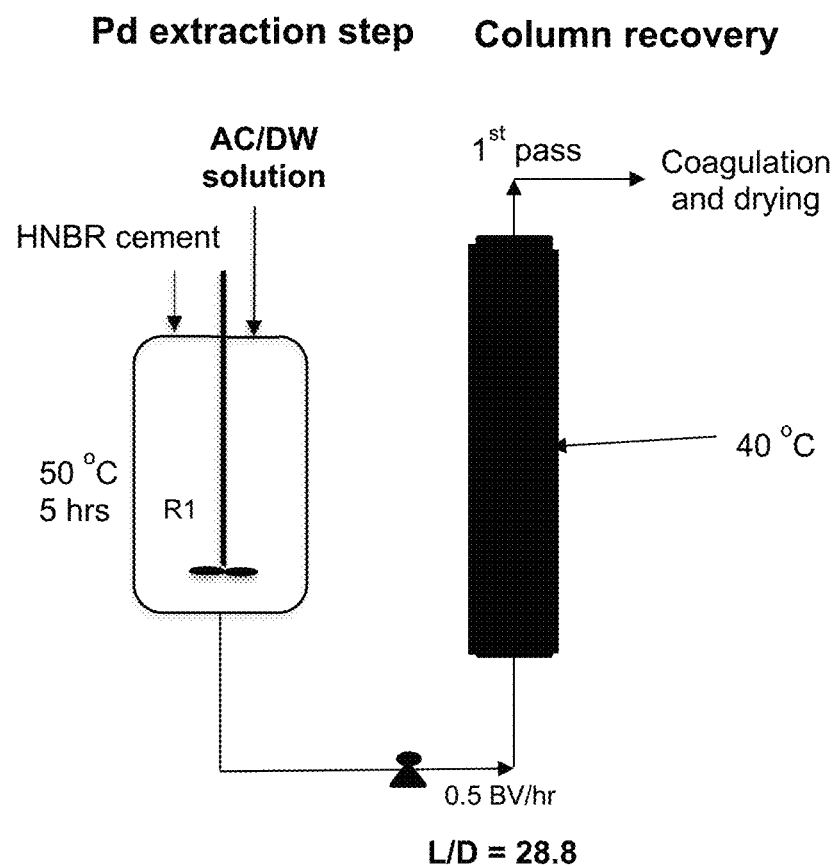
FIG. 3 is a picture of the catalyst extraction step and the column recovery with one column packed ion-exchange resins.

In some embodiments, two columns are used after the catalyst extraction step such as shown in FIG. 2. Each column dimension having 12.2 of L/D is 1.02 cm of diameter and 12 cm of length. In some embodiments, one column after the catalyst extraction step such as shown in FIG. 3. In this column, the column dimension having 28.8 of L/D is 1.02 cm of diameter and 29 cm of length.

In some embodiments, the functional groups in the functional ion exchange resins for packing the column is selected from thiourea, thiouronium, thiol, amine, diamine, triamine, TMT, dithiocarbamate, carbodithioate, and combinations thereof. In some embodiments, the functional group in the functional ion exchange resins is thiourea.

The type and the shape of functional ion exchange resins is not restricted. Examples include spherical type of PS-DVB copolymer, fiber type of olefin copolymer, or spherical type of silica.

The average particle diameter of the functional ion exchange resins is not restricted. Examples of the average particle diameter of functional ion exchange resins for this process is in the range of at minimum 0.07 mm up to less than 1.50 mm dry basis, such as in the range of at minimum 0.15 mm and less than 1.20 mm dry basis, or in the range of at minimum 0.42 mm and less than 0.85 mm dry basis. If the average particle diameter of functional ion exchange resins is lower than 0.07 mm, the pressure drop of the resin packed column is dramatically increased and then it cannot be commercialized even though the catalyst recovery efficiency is high. If the average particle diameter of functional ion exchange resins is higher than 1.50 mm, the catalyst recovery efficiency is decreased even though the pressure drop of the resin packed column is very low.

The temperature of the catalyst extracted HNBR solution is not restricted. It is desirable for the viscosity of the catalyst extracted HNBR solution to flow through the resin packed column with an acceptable pressure drop. The temperature of the catalyst extracted HNBR solution should be lower than the boiling point of the used solvent. If the temperature of the catalyst extracted HNBR solution is higher than that of the used solvent during passing the resin packed column, the catalyst recovery efficiency will be reduced because of the formation of a lot of bubbles.

Quantity of the effluent discharged from the column packed with an ion exchange resin after it was charged into the column is represented by the relative value based on the resin bed volume (BV) which is the volume of ion exchange resin used in a column. The flow rate of the effluent is directly related to the catalyst recovery efficiency and it is called the space velocity (SV=Q/V: flow rate of the effluent/bed volume) and it is represented by the bed volume per hour (BV/hr). The flow rate (BV/hr) is controlled based on the solid content of HNBR polymer in HNBR solution, the residual catalyst concentration, column numbers, and the viscosity of HNBR solution.

The typical flow rate (BV/hr) of Pd extracted HNBR solution having HNBR polymer of 1-20% by weight is from 0.01 BV/hr to 10.0 BV/hr, preferably from 0.1 BV/hr to 5.0 BV/hr, more preferably from 0.2 BV/hr to 3.0 BV/hr.

The catalyst recovery efficiency is the volume of effluent before breakthrough. The volume of effluent is measured in the amount of bed volume numbers (BVs), the total volume, solid and liquid of the column. Breakthrough is when the concentration of the exchanging ion (catalyst ion or palladium complex) in the effluent increases to reach a predetermined limit. When breakthrough is reached, the column no longer has a desired effectiveness. The target catalyst recovery efficiency of this process is over 100 BVs, preferably over 1000 BVs, more preferably 5000 BVs; with over 60% of the residual catalyst in HNBR solution being removed.

Normal ion exchange resins have functional groups on the surface of the resins. When BVs are increased, the catalyst recovery efficiency is reached at the critical point. At that point, the concentration of the exchanging ion that is removed decreases. The critical point occurs when the readily available functional groups on the resins have been used.

After completely passing the catalyst extracted HNBR solution through the resin packed column, coagulation with a polar solvent allows for the separation of the hydrogenated nitrile rubber from the catalyst separated HNBR solution. The coagulation method with the polar solvent can use a typical coagulation method, such as where the polar solvent is water, methanol, ethanol, or other alcohol. In some embodiments, water is the polar solvent.

After coagulation of the catalyst separated HNBR solution, the final product (the catalyst separated HNBR) can be obtained with a typical drying method.

The residual catalyst in the final hydrogenated nitrile rubber can be measured by using ICP (Inductively Coupled Plasma Argon Emission Spectroscopy).

The extracted and separated catalyst from the hydrogenated nitrile rubber solution can be recovered from the used resins after separating the used resins from the used resin column. After more purification of the used resins by using calcination, purified palladium is obtained. The recovery efficiency of the purified palladium is depended on the ability of the catalyst recovery process.

While the present disclosure has illustrated by the description of several embodiments and while the illustrative embodiments have been described in considerable detail, it is not the intention of the applicant to restrict or in any way limit the scope of the appended claims to such detail. Additional advantages and modifications may readily appear to those skilled in the art. Furthermore, features from separate lists can be combined; and features from the examples can be generalized to the whole disclosure.

EXAMPLES

Example 1

Figure 4:
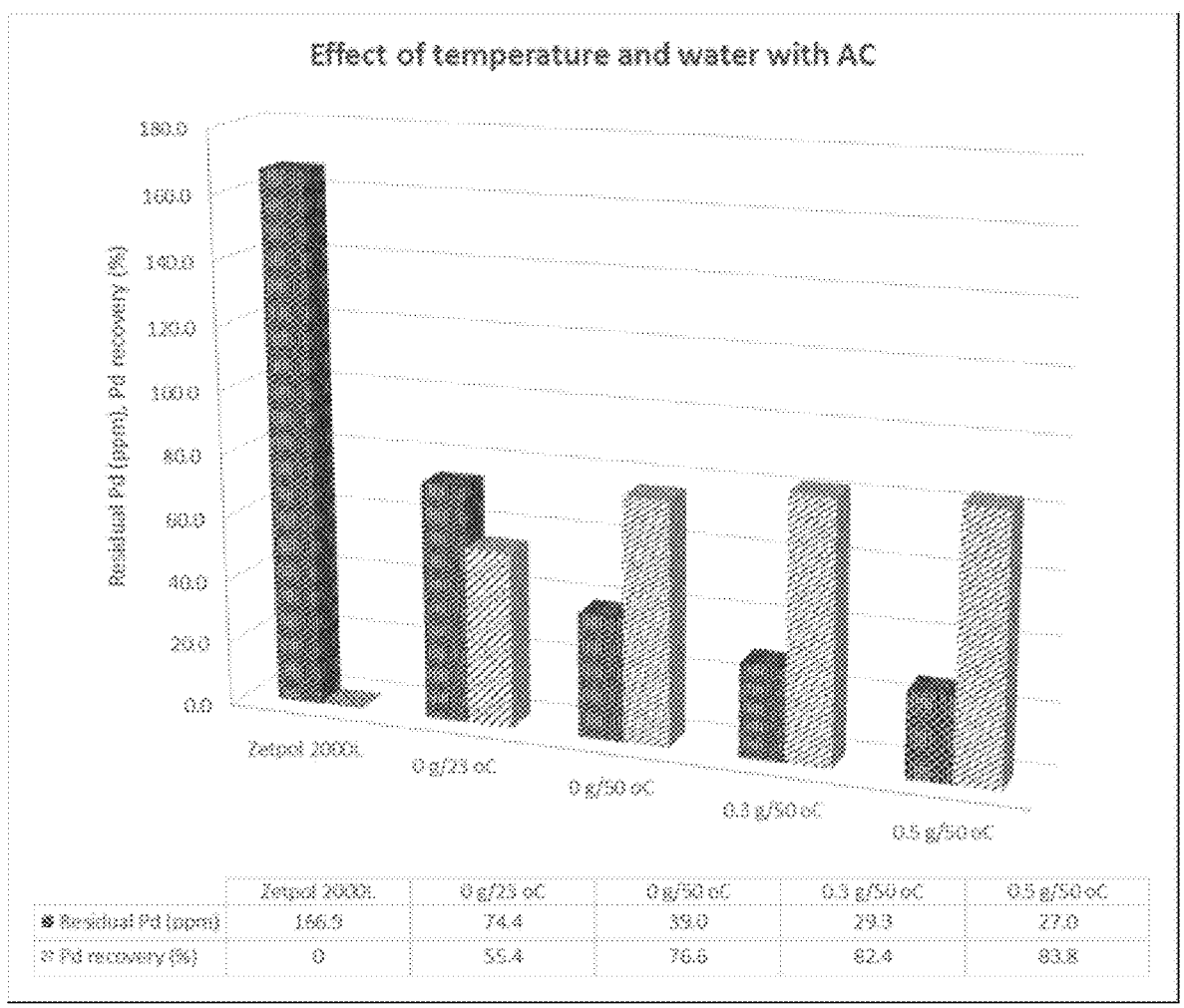
FIG. 4 is a picture of the effect of temperature and water in catalyst extraction step with ammonium salt (example 1-4).

A fully hydrogenated acrylonitrile-butadiene rubber solution (ZETPOL 2000L cement from Zeon Chemicals LP) was made with heterogeneous catalyst (silica-supported palladium) in acetone. After finishing the hydrogenation with heterogeneous catalyst under hydrogen in high pressure, most of the palladium was recovered by using silica supported state. To measure residual palladium in ZETPOL 2000L cement after recovering most of the silica supported palladium, ZETPOL 2000L cement was fully coagulated with excess amount of water and dried. The dried ZETPOL 2000L was shown to have 166.9 ppm of residual palladium by using ICP method. 46 g of Zetpol 2000L cement having 166.9 ppm of residual palladium and 13.1% of solid by weight was placed in 1 liter of a glass jar attached with an agitator. 104 g of acetone was added to the Zetpol 2000L cement and was stirred until it formed a homogeneous state. The total solid content was 4% by weight. 0.10 g of ammonium chloride was added at 23° C. to the 4% of Zetpol 2000L cement. After adding ammonium chloride, the catalyst extraction step was conducted for 5 hours. At the end of the catalyst extraction step, an excess amount of water was added to coagulate the polymer. After filtering and drying the completely coagulated polymer, 5.44 g of the dried polymer was obtained. The dried polymer was measured for residual palladium using ICP (Inductively Coupled Plasma Argon Emission Spectroscopy) using an Agilent 5110 ICP. The residual palladium of the dried HNBR polymer (Zetpol 2000L) was 74.4 ppm and the palladium extraction efficiency of the dried HNBR polymer was 55.4%. The results are shown in Table 1 and FIG. 4.

Example 2-4

Example 2 was prepared according to the same procedure as Example 1 except the temperature during the catalyst extraction step. The catalyst extraction step was conducted at 50° C. with 0.10 g of ammonium chloride in 150 g of the 4% of Zetpol 2000L cement under agitation for 5 hours. After the catalyst extraction step, an excess amount of water was added to coagulate the polymer. After filtering and drying the completely coagulated polymer, 5.48 g of the dried polymer was obtained. The dried polymer was measured for residual palladium using ICP (Inductively Coupled Plasma Argon Emission Spectroscopy). The residual palladium of the dried HNBR polymer (Zetpol 2000L) was 39.0 ppm and the palladium extraction efficiency of the dried HNBR polymer was 76.6%. The results are shown in Table 1 and FIG. 4.

Example 3 was prepared according to the same procedure as Example 1 except adding 25% of ammonium chloride aqueous solution at 50° C. for 5 hours for catalyst extraction step. Catalyst extraction step was conducted at 50° C. with 0.4 g of 25% (by weight) ammonium chloride aqueous solution after mixing 0.1 g of ammonium chloride and 0.3 g of water in 150 g of the 4% of Zetpol 2000L cement under agitation for 5 hours. After the catalyst extraction step, an excess amount of water was added to coagulate the polymer. After filtering and drying the completely coagulated polymer, 5.49 g of the dried polymer was obtained. The dried polymer was measured for the residual palladium using ICP (Inductively Coupled Plasma Argon Emission Spectroscopy). The residual palladium of the dried HNBR polymer (Zetpol 2000L) was 29.3 ppm and the palladium extraction efficiency of the dried HNBR polymer was 82.4%. The results are shown in Table 1 and FIG. 4.

Example 4 was prepared according to the same procedure as Example 1 except adding 16.7% of ammonium chloride aqueous solution at 50° C. for 5 hours for catalyst extraction step. Catalyst extraction step was conducted at 50° C. with 0.6 g of 16.7% (by weight) ammonium chloride aqueous solution after mixing 0.1 g of ammonium chloride and 0.5 g of water in 150 g of the 4% of Zetpol 2000L cement under agitation for 5 hours. After the catalyst extraction step, an excess amount of water was added to coagulate the polymer. After filtering and drying the completely coagulated polymer, 5.22 g of the dried polymer was obtained. The dried polymer was measured for residual palladium using ICP (Inductively Coupled Plasma Argon Emission Spectroscopy). The residual palladium of the dried HNBR polymer (Zetpol 2000L) was 27.0 ppm and the palladium extraction efficiency of the dried HNBR polymer was 83.8%. The results are shown in Table 1 and FIG. 4.

TABLE 1

| | Zetpol 2000L cement[a] | | | | | Reaction | Zetpol | Pd in | Pd | AC/DW solution[d] | |
| | TSC | AC[b] | DW[c] | Temperature | time | 2000L | HNBR | extraction | | |
| Sample ID | (%)[e] | (g) | (g) | (g) | (° C.) | (hrs) | (g) | (ppm) | (%) | (g) | (wt %) |
|---|---|---|---|---|---|---|---|---|---|---|---|
| Zetpol 2000L | | | | | | | | 166.9 | 0 | | |
| Example 1 | 4.0 | 150 | 0.1 | 0.0 | 23 | 5 | 5.44 | 74.4 | 55.4 | 0.1 | 100.0 |
| Example 2 | 4.0 | 150 | 0.1 | 0.0 | 50 | 5 | 5.48 | 39.0 | 76.6 | 0.1 | 100.0 |
| Example 3 | 4.0 | 150 | 0.1 | 0.3 | 50 | 5 | 5.49 | 29.3 | 82.4 | 0.4 | 25.0 |
| Example 4 | 4.0 | 150 | 0.1 | 0.5 | 50 | 5 | 5.22 | 27.0 | 83.8 | 0.6 | 16.7 |

[a]Zetpol 2000L cement: Hydrogenated nitrile rubber-acetone solution having 13.1% of solid content, 36% of acrylonitrile and 99% of hydrogenation (Zeon Chemicals LP)
[b]AC: Ammonium Chloride: NH$_4$Cl - Insoluble in acetone and soluble in water (26.7 wt % at RT)
[c]DW: Deionized water
[d]AC/DW solution (wt %): Ammonium chloride (%) in ammonium chloride aqueous solution by weight
[e]TSC (%): Total solid content during catalyst extraction step Example 5

In Example 5 a fully hydrogenated acrylonitrile-butadiene rubber solution (ZETPOL 2000L cement from Zeon Chemicals LP) was made with heterogeneous catalyst (silica-supported palladium) in acetone. After finishing the hydrogenation with heterogeneous catalyst under hydrogen in high pressure, most of palladium was recovered by using silica supported state. After fully coagulation with excess amount of water and drying, 166.90 ppm of residual palladium was existed in the fully hydrogenated acrylonitrile-butadiene rubber. 46 g of Zetpol 2000L cement having 166.90 ppm of residual palladium and 13.1% of solid by weight was placed in 1 liter of a glass jar attached with an agitator. 104 g of acetone was added to the Zetpol 2000L cement and it was stirred for a homogeneous state. The total solid content was 4% by weight. In another beaker, 0.009 g of ammonium chloride and 0.30 g of deionized water was mixed to make 2.8% of ammonium chloride/water solution (AC/DW solution). 0.3009 g of 2.8% AC/DW solution was added at room temperature to the 4% of Zetpol 2000L cement and then it was heated to 50° C. After heating the reactor temperature to 50° C., the catalyst extraction step was conducted for 5 hours. At the end of the catalyst extraction step, after cooling the reactor to room temperature, and then an excess amount of water was added to make the complete coagulation. After filtering and drying the completely coagulated polymer, 5.34 g of the dried polymer was obtained. The dried polymer was measured for the residual palladium using ICP (Inductively Coupled Plasma Argon Emission Spectroscopy). The residual palladium of the dried HNBR polymer (Zetpol 2000L) was 38.5 ppm and the palladium extraction efficiency of the dried HNBR polymer was 76.9%. The results are shown in Table 2.

Example 6-15

Example 6 was prepared according to the same procedure as Example 5 except the total solid content and amount of ammonium chloride. 69 g of Zetpol 2000L cement having 166.90 ppm of residual palladium and 13.1% of solid by weight was placed in 1 liter of a glass jar attached with an agitator. 81 g of acetone was added to the Zetpol 2000L cement and it was stirred for a homogeneous state. The total solid content was 6% by weight. In another beaker, 0.026 g of ammonium chloride and 0.30 g of deionized water was mixed to make 7.9% of ammonium chloride/water solution (AC/DW solution). After the catalyst extraction step, an excess amount of water was added to coagulate the polymer. After filtering and drying the completely coagulated polymer, 8.65 g of the dried polymer was obtained. The dried polymer was measured for the residual palladium using ICP (Inductively Coupled Plasma Argon Emission Spectroscopy). The residual palladium of the dried HNBR polymer (Zetpol 2000L) was 34.3 ppm and the palladium extraction efficiency of the dried HNBR polymer was 79.4%. The results are shown in Table 2.

Example 7 was prepared according to the same procedure as Example 5 except the total solid content, amount of ammonium chloride, and amount of deionized water. 92 g of Zetpol 2000L cement having 166.90 ppm of residual palladium and 13.1% of solid by weight was placed in 1 liter of a glass jar attached with an agitator. 58 g of acetone was added to the Zetpol 2000L cement and it was stirred for a homogeneous state. The total solid content was 8% by weight. In another beaker, 0.04 g of ammonium chloride and 0.50 g of deionized water was mixed to make 7.4% of ammonium chloride/water solution (AC/DW solution). After the catalyst extraction step, an excess amount of water was added to coagulate the polymer. After filtering and drying the completely coagulated polymer, 11.58 g of the dried polymer was obtained. The dried polymer was measured for the residual palladium using ICP (Inductively Coupled Plasma Argon Emission Spectroscopy). The residual palladium of the dried HNBR polymer (Zetpol 2000L) was 30.4 ppm and the palladium extraction efficiency of the dried HNBR polymer was 81.8%. The results are shown in Table 2.

Example 8 was prepared according to the same procedure as Example 7 except the amount of ammonium chloride. The amount of ammonium chloride was used 0.03 g instead of 0.04 g with 0.5 g of deionized water to make 5.7% of ammonium chloride/water solution (AC/DW solution). After the catalyst extraction step, an excess amount of water was added to coagulate the polymer. After filtering and drying the completely coagulated polymer, 11.65 g of the dried polymer was obtained. The dried polymer was measured for the residual palladium using ICP (Inductively Coupled Plasma Argon Emission Spectroscopy). The residual palladium of the dried HNBR polymer (Zetpol 2000L) was 40.6 ppm and the palladium extraction efficiency of the dried HNBR polymer was 75.7%. The results are shown in Table 2.

Example 9 was prepared according to the same procedure as Example 7 except the amount of ammonium chloride. The amount of ammonium chloride was used 0.02 g instead of 0.04 g with 0.5 g of deionized water to make 3.8% of ammonium chloride/water solution (AC/DW solution).

After the catalyst extraction step, an excess amount of water was added to coagulate the polymer. After filtering and drying the completely coagulated polymer, 11.68 g of the dried polymer was obtained. The dried polymer was measured for the residual palladium using ICP (Inductively Coupled Plasma Argon Emission Spectroscopy). The residual palladium of the dried HNBR polymer (Zetpol 2000L) was 45.5 ppm and the palladium extraction efficiency of the dried HNBR polymer was 72.7%. The results are shown in Table 2.

Example 10 was prepared according to the same procedure as Example 5 except the total solid content, amount of ammonium chloride, and amount of deionized water. 115 g of Zetpol 2000L cement having 136.0 ppm of residual palladium and 13.1% of solid by weight was placed in 1 liter of a glass jar attached with an agitator. 36 g of acetone was added to the Zetpol 2000L cement and it was stirred for a homogeneous state. The total solid content was 10% by weight. In another beaker, 0.04 g of ammonium chloride and 0.50 g of deionized water was mixed to make 7.4% of ammonium chloride/water solution (AC/DW solution). After the catalyst extraction step, an excess amount of water was added to coagulate the polymer. After filtering and drying the completely coagulated polymer, 14.87 g of the dried polymer was obtained. The dried polymer was measured for the residual palladium using ICP (Inductively Coupled Plasma Argon Emission Spectroscopy). The residual palladium of the dried HNBR polymer (Zetpol 2000L) was 28.0 ppm and the palladium extraction efficiency of the dried HNBR polymer was 79.4%. The results are shown in Table 2.

Example 11 was prepared according to the same procedure as Example 10 except the amount of ammonium chloride. The amount of ammonium chloride was used 0.03 g instead of 0.04 g with 0.5 g of deionized water to make 5.7% of ammonium chloride/water solution (AC/DW solution). After the catalyst extraction step, an excess amount of water was added to coagulate the polymer. After filtering and drying the completely coagulated polymer, 14.95 g of the dried polymer was obtained. The dried polymer was measured for the residual palladium using ICP (Inductively Coupled Plasma Argon Emission Spectroscopy). The residual palladium of the dried HNBR polymer (Zetpol 2000L) was 29.1 ppm and the palladium extraction efficiency of the dried HNBR polymer was 78.6%. The results are shown in Table 2.

Example 12 was prepared according to the same procedure as Example 11 except the amount of deionized water. The amount of deionized water was used 0.40 g instead of 0.50 g with 0.03 g of ammonium chloride to make 7.0% of ammonium chloride/water solution (AC/DW solution). After the catalyst extraction step, an excess amount of water was added to coagulate the polymer. After filtering and drying the completely coagulated polymer, 14.94 g of the dried polymer was obtained. The dried polymer was measured for the residual palladium using ICP (Inductively Coupled Plasma Argon Emission Spectroscopy). The residual palladium of the dried HNBR polymer (Zetpol 2000L) was 30.1 ppm and the palladium extraction efficiency of the dried HNBR polymer was 77.9%. The results are shown in Table 2.

Example 13 was prepared according to the same procedure as Example 10 except the amount of ammonium chloride and deionized water. The amount of ammonium chloride was used 0.02 g instead of 0.04 g and the amount of deionized water was used 0.75 g instead of 0.50 g to make 2.6% of ammonium chloride/water solution (AC/DW solution). After the catalyst extraction step, an excess amount of water was added to coagulate the polymer. After filtering and drying the completely coagulated polymer, 14.97 g of the dried polymer was obtained. The dried polymer was measured for the residual palladium using ICP (Inductively Coupled Plasma Argon Emission Spectroscopy). The residual palladium of the dried HNBR polymer (Zetpol 2000L) was 30.7 ppm and the palladium extraction efficiency of the dried HNBR polymer was 77.4%. The results are shown in Table 2.

Example 14 was prepared according to the same procedure as Example 10 except the amount of ammonium chloride and deionized water. The amount of ammonium chloride was used 0.015 g instead of 0.04 g and the amount of deionized water was used 1.00 g instead of 0.50 g to make 1.5% of ammonium chloride/water solution (AC/DW solution). After the catalyst extraction step, an excess amount of water was added to coagulate the polymer. After filtering and drying the completely coagulated polymer, 14.97 g of the dried polymer was obtained. The dried polymer was measured for the residual palladium using ICP (Inductively Coupled Plasma Argon Emission Spectroscopy). The residual palladium of the dried HNBR polymer (Zetpol 2000L) was 34.1 ppm and the palladium extraction efficiency of the dried HNBR polymer was 74.9%. The results are shown in Table 2.

Example 15 was prepared according to the same procedure as Example 5 except the total solid content, the amount of ammonium chloride, and the amount of deionized water. 150 g of Zetpol 2000L cement having 166.90 ppm of residual palladium and 13.1% of solid by weight was placed in 1 liter of a glass jar attached with an agitator. In another beaker, 0.030 g of ammonium chloride and 0.75 g of deionized water was mixed to make 3.8% of ammonium chloride/water solution (AC/DW solution). After the catalyst extraction step, an excess amount of water was added to coagulate the polymer. After filtering and drying the completely coagulated polymer, 19.82 g of the dried polymer was obtained. The dried polymer was measured for the residual palladium using ICP (Inductively Coupled Plasma Argon Emission Spectroscopy). The residual palladium of the dried HNBR polymer (Zetpol 2000L) was 49.2 ppm and the palladium extraction efficiency of the dried HNBR polymer was 65.7%. The results are shown in Table 2.

TABLE 2

| | Pd extraction step | | | | | | | | | |
|---|---|---|---|---|---|---|---|---|---|---|
| | Zetpol 2000L cement[a] | | | | Reaction | Zetpol | Pd in | Pd | AC/DW solution[d] | |
| | TSC | AC[b] | DW[c] | Temperature | time | 2000L | HNBR | extraction | | |
| Sample ID | (%)[e] | (g) | (g) | (g) | (° C.) | (hrs) | (g) | (ppm) | (%) | (g) | wt (%) |
| Example 5 | 4.0 | 150 | 0.009 | 0.30 | 50 | 5 | 5.34 | 38.5 | 76.9 | 0.31 | 2.8 |
| Example 6 | 6.0 | 150 | 0.026 | 0.30 | 50 | 5 | 8.65 | 34.3 | 79.4 | 0.33 | 7.9 |
| Example 7 | 8.0 | 150 | 0.040 | 0.50 | 50 | 5 | 11.58 | 30.3 | 81.8 | 0.54 | 7.4 |
| Example 8 | 8.0 | 150 | 0.030 | 0.50 | 50 | 5 | 11.65 | 40.6 | 75.7 | 0.53 | 5.7 |
| Example 9 | 8.0 | 150 | 0.020 | 0.50 | 50 | 5 | 11.68 | 45.5 | 72.7 | 0.52 | 3.8 |

TABLE 2-continued

| | Zetpol 2000L cement[a] | | | | | Reaction | Zetpol | Pd in | Pd | AC/DW | |
| | TSC | AC[b] | DW[c] | | Temperature | time | 2000L | HNBR | extraction | solution[d] | |
| Sample ID | (%)[e] | (g) | (g) | (g) | (° C.) | (hrs) | (g) | (ppm) | (%) | (g) | wt (%) |
|---|---|---|---|---|---|---|---|---|---|---|---|
| Example 10 | 10.0 | 150 | 0.040 | 0.50 | 50 | 5 | 14.87 | 28.0 | 79.4 | 0.54 | 7.4 |
| Example 11 | 10.0 | 150 | 0.030 | 0.50 | 50 | 5 | 14.95 | 29.1 | 78.6 | 0.53 | 5.7 |
| Example 12 | 10.0 | 150 | 0.030 | 0.40 | 50 | 5 | 14.94 | 30.1 | 77.9 | 0.43 | 7.0 |
| Example 13 | 10.0 | 150 | 0.020 | 0.75 | 50 | 5 | 14.97 | 30.7 | 77.4 | 0.77 | 2.6 |
| Example 14 | 10.0 | 150 | 0.015 | 1.00 | 50 | 5 | 14.97 | 34.1 | 74.9 | 1.02 | 1.5 |
| Example 15 | 13.1 | 150 | 0.030 | 0.75 | 50 | 5 | 19.82 | 49.2 | 65.7 | 0.78 | 3.8 |

[a]Zetpol 2000L cement: Hydrogenated nitrile rubber-acetone solution having 13.1% of solid content, 36% of acrylonitrile and 99% of hydrogenation (Zeon Chemicals LP)
[b]AC: Ammonium Chloride: NH$_4$Cl - Insoluble in acetone and soluble in water (26.7 wt % at RT)
[c]DW: Deionized water
[d]AC/DW solution (wt %): Ammonium chloride (%) in ammonium chloride aqueous solution by weight
[e]TSC (%): Total solid content during catalyst extraction step

Example 16

In Example 16 a fully hydrogenated acrylonitrile-butadiene rubber solution (ZETPOL 2000L cement from Zeon Chemicals LP) was made with heterogeneous catalyst (silica-supported palladium) in acetone. After finishing the hydrogenation with heterogeneous catalyst under hydrogen in high pressure, most of palladium was recovered by using silica supported state. After fully coagulation with excess amount of water and drying, 124.60 ppm of residual palladium was existed in the fully hydrogenated acrylonitrile-butadiene rubber. 1000 g of Zetpol 2000L cement having 124.60 ppm of residual palladium and 13.5% of solid by weight was placed in 2.5 liter of a glass jar attached with an agitator. In another beaker, 0.20 g of ammonium chloride and 6.67 g of deionized water was mixed to make 2.9% of ammonium chloride/water solution (AC/DW solution). 6.87 g of 2.9% AC/DW solution was added at room temperature to the 13.5% of Zetpol 2000L cement and then it was heated to 50° C. After heating the reactor temperature to 50° C., the catalyst extraction step was conducted for 5 hours. At the end of the catalyst extraction step, after cooling the reactor to room temperature, and then an excess amount of water was added to make the complete coagulation. After filtering and drying the completely coagulated polymer, the residual palladium was measured by using ICP (Inductively Coupled Plasma Argon Emission Spectroscopy). The residual palladium of the dried HNBR polymer (Zetpol 2000L) was 40.8 ppm and the palladium extraction efficiency of the dried HNBR polymer was 67.3%. The results are shown in Table 3.

Example 17 was prepared according to the same procedure as Example 16 except the amount of deionized water. The amount of deionized water was used 5.00 g instead of 6.67 g with 0.20 g of ammonium chloride to make 3.8% of ammonium chloride/water solution (AC/DW solution). After the catalyst extraction step, an excess amount of water was added to coagulate the polymer. After filtering and drying the completely coagulated polymer, the residual palladium was measured by using ICP (Inductively Coupled Plasma Argon Emission Spectroscopy). The residual palladium of the dried HNBR polymer (Zetpol 2000L) was 50.2 ppm and the palladium extraction efficiency of the dried HNBR polymer was 59.7%. The results are shown in Table 3.

Example 18 was prepared according to the same procedure as Example 16 except the amount of deionized water. The amount of deionized water was used 3.33 g instead of 6.67 g with 0.20 g of ammonium chloride to make 5.7% of ammonium chloride/water solution (AC/DW solution). After the catalyst extraction step, an excess amount of water was added to coagulate the polymer. After filtering and drying the completely coagulated polymer, the residual palladium was measured by using ICP (Inductively Coupled Plasma Argon Emission Spectroscopy). The residual palladium of the dried HNBR polymer (Zetpol 2000L) was 57.1 ppm and the palladium extraction efficiency of the dried HNBR polymer was 54.2%. The results are shown in Table 3.

TABLE 3

| | Zetpol 2000L cement[a] | | | | | Reaction | Pd in | Pd | AC/DW | |
| | TSC | AC[b] | DW[c] | | Temperature | time | HNBR | extraction | solution[d] | |
| Sample ID | (%)[e] | (g) | (g) | (g) | (° C.) | (hrs) | (ppm) | (%) | (g) | wt (%) |
|---|---|---|---|---|---|---|---|---|---|---|
| Example 16 | 13.5 | 1000 | 0.200 | 6.67 | 50 | 5 | 40.8 | 67.3 | 6.87 | 2.9 |
| Example 17 | 13.5 | 1000 | 0.200 | 5.00 | 50 | 5 | 50.2 | 59.7 | 5.20 | 3.8 |
| Example 18 | 13.5 | 1000 | 0.200 | 3.33 | 50 | 5 | 57.1 | 54.2 | 3.53 | 5.7 |

[a]Zetpol 2000L cement: Hydrogenated nitrile rubber-acetone solution having 13.1% of solid content, 36% of acrylonitrile and 99% of hydrogenation (Zeon Chemicals LP)
[b]AC: Ammonium Chloride: NH$_4$Cl - Insoluble in acetone and soluble in water (26.7 wt % at RT)
[c]DW: Deionized water
[d]AC/DW solution (wt %): Ammonium chloride (%) in ammonium chloride aqueous solution by weight
[e]TSC (%): Total solid content during catalyst extraction step

Example 19

In Example 19 a partially hydrogenated acrylonitrile-butadiene rubber solution (ZETPOL 2010 cement from Zeon Chemicals LP) was made with heterogeneous catalyst (silica-supported palladium) in acetone. After finishing the hydrogenation with heterogeneous catalyst under hydrogen in high pressure, most of the palladium was recovered by using silica supported state. After fully coagulation with excess amount of water and drying, 42.30 ppm of residual palladium was existed in the partially hydrogenated acrylonitrile-butadiene rubber. 1000 g of Zetpol 2010 cement having 42.30 ppm of residual palladium and 12.7% of solid by weight was placed in 2.5 liter of a glass jar attached with an agitator. In another beaker, 0.20 g of ammonium chloride and 6.67 g of deionized water was mixed to make 2.9% of ammonium chloride/water solution (AC/DW solution). 6.87 g of 2.9% AC/DW solution was added at room temperature to the 12.7% of Zetpol 2010 cement under atmosphere state with air in the headspace (closed system) and then it was heated to 50° C. After heating the reactor temperature to 50° C., the catalyst extraction step was conducted for 5 hours. At the end of the catalyst extraction step, after cooling the reactor to room temperature, and then an excess amount of water was added to make the complete coagulation. After filtering and drying the completely coagulated polymer, the residual palladium was measured by using ICP (Inductively Coupled Plasma Argon Emission Spectroscopy). The residual palladium of the dried HNBR polymer (Zetpol 2010) was 17.3 ppm and the palladium extraction efficiency of the dried HNBR polymer was 59.1%. The results are shown in Table 4.

Example 20 was prepared according to the same procedure as Example 19 except nitrogen in the headspace instead of air condition. After the catalyst extraction step, an excess amount of water was added to coagulate the polymer. After filtering and drying the completely coagulated polymer, the residual palladium was measured by using ICP (Inductively Coupled Plasma Argon Emission Spectroscopy). The residual palladium of the dried HNBR polymer (Zetpol 2010) was 24.1 ppm and the palladium extraction efficiency of the dried HNBR polymer was 43.0%. The results are shown in Table 4.

Example 21 was prepared according to the same procedure as Example 19 except 10.0% of TSC instead of 12.7%. 213 g of acetone was added to 788 g of 12.7% of Zetpol 2010 cement to make 1000 g of 10.0% Zetpol 2010 cement. After the catalyst extraction step, an excess amount of water was added to coagulate the polymer. After filtering and drying the completely coagulated polymer, the residual palladium was measured by using ICP (Inductively Coupled Plasma Argon Emission Spectroscopy). The residual palladium of the dried HNBR polymer (Zetpol 2010) was 17.0 ppm and the palladium extraction efficiency of the dried HNBR polymer was 59.8%. The results are shown in Table 4.

Example 22 was prepared according to the same procedure as Example 19 except 10.0% of TSC instead of 12.7%. 64 g of acetone was added to 256 g of 12.7% of Zetpol 2010 cement to make 300 g of 10.0% Zetpol 2010 cement. After the catalyst extraction step, an excess amount of water was added to coagulate the polymer. After filtering and drying the completely coagulated polymer, the residual palladium was measured by using ICP (Inductively Coupled Plasma Argon Emission Spectroscopy). The residual palladium of the dried HNBR polymer (Zetpol 2010) was 16.2 ppm and the palladium extraction efficiency of the dried HNBR polymer was 61.7%. The results are shown in Table 4.

TABLE 4

Pd extraction step

| Sample ID | Zetpol 2010 cement[a] TSC (%)[e] | (g) | AC[b] (g) | DW[c] (g) | Temperature (° C.) | Reaction time (hrs) | Oxidation Headspace | Pd in HNBR (ppm) | Pd extraction (%) | AC/DW solution[d] (g) | wt (%) |
|---|---|---|---|---|---|---|---|---|---|---|---|
| Example 19 | 12.7 | 1000 | 0.200 | 6.67 | 50 | 5 | Air | 17.3 | 59.1 | 6.87 | 2.9 |
| Example 20 | 12.7 | 1000 | 0.200 | 6.67 | 50 | 5 | N2 | 24.1 | 43.0 | 6.87 | 2.9 |
| Example 21 | 10.0 | 1000 | 0.200 | 6.67 | 50 | 5 | Air | 17.0 | 59.8 | 6.87 | 2.9 |
| Example 22 | 10.0 | 300 | 0.060 | 2.00 | 50 | 5 | Air | 16.2 | 61.7 | 2.06 | 2.9 |

[a]Zetpol 2010 cement: Hydrogenated nitrile rubber-acetone solution having 12.7% of solid content, 36% of acrylonitrile and 95% of hydrogenation (Zeon Chemicals LP)
[b]AC: Ammonium Chloride: NH4Cl - Insoluble in acetone and soluble in water (26.7 wt % at RT)
[c]DW: Deionized water
[d]AC/DW solution (wt %): Ammonium chloride (%) in ammonium chloride aqueous solution by weight
[e]TSC (%): Total solid content during catalyst extraction step

Example 23

In Example 23 a fully hydrogenated acrylonitrile-acrylate-butadiene rubber solution (ZETPOL 4300 cement from Zeon Chemicals LP) was made with heterogeneous catalyst (silica-supported palladium) in acetone. After finishing the hydrogenation with the heterogeneous catalyst under hydrogen in high pressure, most of the palladium was recovered by using silica supported state. After fully coagulation with excess amount of water and drying, 140.30 ppm of residual palladium was existed in the fully hydrogenated acrylonitrile-butadiene rubber. 984 g of Zetpol 4300 cement having 140.30 ppm of residual palladium and 12.2% of solid by weight was placed in 2.5 liter of a glass jar attached with an agitator. 516 g of acetone was added to make 8.0% of TSC and mixed to make a homogeneous solution. In another beaker, 0.30 g of ammonium chloride and 5.0 g of deionized water was mixed to make 5.7% of ammonium chloride/water solution (AC/DW solution). 5.30 g of 5.7% AC/DW solution was added at room temperature to the 8.0% of Zetpol 4300 cement under atmosphere state with air in the headspace (closed system) and then it was heated to 50° C. After heating the reactor temperature to 50° C., the catalyst extraction step was conducted for 5 hours. At the end of the catalyst extraction step, after cooling the reactor to room temperature, and then an excess amount of water was added to make the complete coagulation. After filtering and drying the completely coagulated polymer, the residual palladium was measured by using ICP (Inductively Coupled Plasma Argon Emission Spectroscopy). The residual palladium of the dried HNBR polymer (Zetpol 4300) was 44.4 ppm and the palladium extraction efficiency of the dried HNBR polymer was 68.4%. The results are shown in Table 4.

Example 24 was prepared according to the same procedure as Example 23 except different amount of ammonium chloride and water. After the catalyst extraction step, an excess amount of water was added to coagulate the polymer. After filtering and drying the completely coagulated polymer, the residual palladium was measured by using ICP (Inductively Coupled Plasma Argon Emission Spectroscopy). The residual palladium of the dried HNBR polymer (Zetpol 4300) was 43.2 ppm and the palladium extraction efficiency of the dried HNBR polymer was 69.2%. The results are shown in Table 5.

Example 26 was prepared according to the same procedure as Example 25 except 40° C. under air. After the catalyst extraction step, an excess amount of water was added to coagulate the polymer. After filtering and drying the completely coagulated polymer, the residual palladium was measured by using ICP (Inductively Coupled Plasma Argon Emission Spectroscopy). The residual palladium of the dried HNBR polymer (Zetpol 2000L) was 62.1 ppm and the palladium extraction efficiency of the dried HNBR polymer was 50.2%. The results are shown in Table 6.

Example 27 was prepared according to the same procedure as Example 25 except under air instead of nitrogen. After the catalyst extraction step, an excess amount of water was added to coagulate the polymer. After filtering and drying the completely coagulated polymer, the residual palladium was measured by using ICP (Inductively Coupled Plasma Argon Emission Spectroscopy). The residual palladium of the dried HNBR polymer (Zetpol 2000L) was 41.6

TABLE 5

Pd extraction step

| Sample ID | Zetpol 4300 cement[a] TSC (%)[e] | AC[b] (g) | DW[c] (g) | Temperature (° C.) | Reaction time (hrs) | Pd in HNBR (ppm) | Pd extraction (%) | AC/DW solution[d] (g) | wt (%) |
|---|---|---|---|---|---|---|---|---|---|
| Example 23 | 8.0 | 1500 | 0.300 | 5.0 | 50 | 5 | 44.4 | 68.4 | 5.30 | 5.7 |
| Example 24 | 8.0 | 1500 | 0.150 | 7.5 | 50 | 5 | 43.2 | 69.2 | 7.65 | 2.0 |

[a]Zetpol 4300 cement: Hydrogenated nitrile rubber-acetone solution having 13.1% of solid content, 17% of acrylonitrile and 99% of hydrogenation (Zeon Chemicals LP)
[b]AC: Ammonium Chloride: $NH_4Cl$ - Insoluble in acetone and soluble in water (26.7 wt % at RT)
[c]DW: Deionized water
[d]AC/DW solution (wt %): Ammonium chloride (%) in ammonium chloride aqueous solution by weight
[e]TSC (%): Total solid content during catalyst extraction step Example 25

In Example 25 a fully hydrogenated acrylonitrile-butadiene rubber solution (ZETPOL 2000L cement from Zeon Chemicals LP) was made with heterogeneous catalyst (silica-supported palladium) in acetone. After finishing the hydrogenation with heterogeneous catalyst under hydrogen in high pressure, most of palladium was recovered by using silica supported state. After fully coagulation with excess amount of water and drying, 124.60 ppm of residual palladium was existed in the fully hydrogenated acrylonitrile-butadiene rubber. 1000 g of Zetpol 2000L cement having 124.60 ppm of residual palladium and 13.5% of solid by weight was placed in 2.5 liter of a glass jar attached with an agitator. In another beaker, 0.20 g of ammonium chloride and 6.67 g of deionized water was mixed to make 2.9% of ammonium chloride/water solution (AC/DW solution). 6.87 g of 2.9% AC/DW solution was added at room temperature to the 13.5% of Zetpol 2000L cement and then it was heated to 60° C. under nitrogen. After heating the reactor temperature to 60° C., the catalyst extraction step was conducted for 5 hours. At the end of the catalyst extraction step, after cooling the reactor to room temperature, and then an excess amount of water was added to make the complete coagulation. After filtering and drying the completely coagulated polymer, the residual palladium was measured by using ICP (Inductively Coupled Plasma Argon Emission Spectroscopy). The residual palladium of the dried HNBR polymer (Zetpol 2000L) was 55.9 ppm and the palladium extraction efficiency of the dried HNBR polymer was 55.1%. The results are shown in Table 6.

ppm and the palladium extraction efficiency of the dried HNBR polymer was 66.6%. The results are shown in Table 6.

Example 28 was prepared according to the same procedure as Example 25 except 50° C. under air with ferric chloride as a co-oxidant. 0.0097 g of ferric chloride 6 hydrate was mixed with 6.87 g of 2.9% of AC/DW aqueous solution and then added to 1000 g of Zetpol 2000L cement. After oxidation/catalyst extraction step at 50° C. for 5 hours under air, an excess amount of water was added to coagulate the polymer. After filtering and drying the completely coagulated polymer, the residual palladium was measured by using ICP (Inductively Coupled Plasma Argon Emission Spectroscopy). The residual palladium of the dried HNBR polymer (Zetpol 2000L) was 47.2 ppm and the palladium extraction efficiency of the dried HNBR polymer was 62.1%. The results are shown in Table 6.

Example 29-33 were prepared according to the same procedure as Example 25 except 50° C. under nitrogen or 2 vol % of oxygen with ferric chloride 6 hydrate or cupric chloride 2 hydrate depending on different amount of a co-oxidant. After the catalyst extraction step, an excess amount of water was added to coagulate the polymer. After filtering and drying the completely coagulated polymer, the residual palladium was measured by using ICP (Inductively Coupled Plasma Argon Emission Spectroscopy). The residual palladiums of the dried HNBR polymer (Zetpol 2000L) and the palladium extraction efficiencies of the dried HNBR polymer are shown in Table 6.

TABLE 6

Pd extraction step

| Sample ID | Zetpol 2000L cement[a] TSC (%)[e] | (g) | AC[b] (g) | DW[c] (g) | Co-oxidant (g) | Reaction Temp (° C.) | Reaction time (hrs) | Oxidation Headspace | Oxidation comment | Pd in HNBR (ppm) | Pd extraction (%) | Co-oxidant/ AC/DW solution[d] (g) | Co-oxidant/ AC/DW solution[d] wt (%) |
|---|---|---|---|---|---|---|---|---|---|---|---|---|---|
| Example 25 | 13.5 | 1000 | 0.200 | 6.67 | | 60 | 5 | N2 | | 55.9 | 55.1 | 6.87 | 2.9 |
| Example 26 | 13.5 | 1000 | 0.200 | 6.67 | | 40 | 5 | Air | | 62.1 | 50.2 | 6.87 | 2.9 |
| Example 27 | 13.5 | 1000 | 0.200 | 6.67 | | 60 | 5 | Air | | 41.6 | 66.6 | 6.87 | 2.9 |
| Example 28 | 13.5 | 1000 | 0.200 | 6.67 | 0.0097 | 50 | 5 | Air | FeCl3 | 47.2 | 62.1 | 6.87 | 2.9 |
| Example 29 | 13.5 | 1000 | 0.200 | 6.67 | 0.0463 | 50 | 5 | N2 | FeCl3 | 55.2 | 55.7 | 6.87 | 2.9 |
| Example 30 | 13.5 | 1000 | 0.200 | 6.67 | 0.0292 | 50 | 5 | N2 | CuCl2 | 38.9 | 68.8 | 6.90 | 2.9 |
| Example 31 | 13.5 | 1000 | 0.200 | 6.67 | 0.0146 | 50 | 5 | N2 | CuCl2 | 33.0 | 73.5 | 6.88 | 2.9 |
| Example 32 | 13.5 | 1000 | 0.200 | 6.67 | | 50 | 5 | 2 vol % O2 | Headspace | 47.2 | 62.1 | 6.87 | 2.9 |
| Example 33 | 13.5 | 1000 | 0.200 | 6.67 | | 50 | 5 | 2 vol % O2 | Bubbling | 57.5 | 53.9 | 6.87 | 2.9 |

[a]Zetpol 2000L cement: Hydrogenated nitrile rubber-acetone solution having 13.1% of solid content, 36% of acrylonitrile and 99% of hydrogenation (Zeon Chemicals LP)
[b]AC: Ammonium Chloride: NH4Cl - Insoluble in acetone and soluble in water (26.7 wt % at RT)
[c]DW: Deionized water
[d]AC/DW solution (wt %): Ammonium chloride (%) in ammonium chloride aqueous solution by weight
[e]TSC (%): Total solid content during catalyst extraction step Example 34

In Example 34 a partially hydrogenated acrylonitrile-butadiene rubber solution (ZETPOL 2010 cement from Zeon Chemicals LP) was made with heterogeneous catalyst (silica-supported palladium) in acetone. After finishing the hydrogenation with heterogeneous catalyst under hydrogen in high pressure, most of palladium was recovered by using silica supported state. After fully coagulation with excess amount of water and drying, 42.30 ppm of residual palladium was existed in the partially hydrogenated acrylonitrile-butadiene rubber. 1000 g of Zetpol 2010 cement having 42.30 ppm of residual palladium and 12.7% of solid by weight was placed in 2.5 liter of a glass jar attached with an agitator. In another beaker, 0.20 g of ammonium chloride and 6.67 g of deionized water was mixed to make 2.9% of ammonium chloride/water solution (AC/DW solution). 6.87 g of 2.9% AC/DW solution was added at room temperature to the 12.7% of Zetpol 2010 cement under nitrogen in the headspace (closed system) and then it was heated to 50° C. After heating the reactor temperature to 50° C., the catalyst extraction step was conducted for 5 hours. At the end of the catalyst extraction step, after cooling the reactor to room temperature, and then an excess amount of water was added to make the complete coagulation. After filtering and drying the completely coagulated polymer, the residual palladium was measured by using ICP (Inductively Coupled Plasma Argon Emission Spectroscopy). The residual palladium of the dried HNBR polymer (Zetpol 2010) was 24.1 ppm and the palladium extraction efficiency of the dried HNBR polymer was 43.0%. The results are shown in Table 7.

Example 35 was prepared according to the same procedure as Example 34 except air condition in the headspace instead of nitrogen condition. After the catalyst extraction step, an excess amount of water was added to coagulate the polymer. After filtering and drying the completely coagulated polymer, the residual palladium was measured by using ICP (Inductively Coupled Plasma Argon Emission Spectroscopy). The residual palladium of the dried HNBR polymer (Zetpol 2010) was 17.3 ppm and the palladium extraction efficiency of the dried HNBR polymer was 59.1%. The results are shown in Table 7.

Example 36-40 were prepared according to the same procedure as Example 34 except different headspace condition with a co-oxidant such as ferric chloride 6 hydrate or cupric chloride 2 hydrate depending on different amount of a co-oxidant. After the catalyst extraction step, an excess amount of water was added to coagulate the polymer. After filtering and drying the completely coagulated polymer, the residual palladium was measured by using ICP (Inductively Coupled Plasma Argon Emission Spectroscopy). The residual palladiums of the dried HNBR polymer (Zetpol 2010) and the palladium extraction efficiencies of the dried HNBR polymer are shown in Table 7.

TABLE 7

Pd extraction step

| Sample ID | Zetpol 2010 cement[a] TSC (%)[e] | (g) | AC[b] (g) | DW[c] (g) | Co-oxidant (g) | Reaction Temp. (° C.) | Reaction time (hrs) | Oxidation Headspace | Oxidation Co-oxidant | Residual Pd (ppm) | Pd extraction (%) | Co-oxidant/ AC/DW solution[d] (g) | Co-oxidant/ AC/DW solution[d] wt (%) |
|---|---|---|---|---|---|---|---|---|---|---|---|---|---|
| Example 34 | 12.7 | 1000 | 0.200 | 6.67 | | 50 | 5 | N2 | | 24.1 | 43.0 | 6.87 | 2.9 |
| Example 35 | 12.7 | 1000 | 0.200 | 6.67 | | 50 | 5 | Air | | 17.3 | 59.1 | 6.87 | 2.9 |
| Example 36 | 12.7 | 1000 | 0.200 | 6.67 | 0.0463 | 50 | 5 | 2 vol % O2 | FeCl3 | 19.1 | 54.8 | 6.91 | 2.9 |
| Example 37 | 12.7 | 1000 | 0.200 | 6.67 | 0.0292 | 50 | 5 | N2 | CuCl2 | 14.5 | 65.7 | 6.90 | 2.9 |
| Example 38 | 12.7 | 1000 | 0.200 | 6.67 | 0.0146 | 50 | 5 | N2 | CuCl2 | 19.4 | 54.1 | 6.88 | 2.9 |

TABLE 7-continued

| | Zetpol 2010 cement[a] | | | Co-oxidant | Reaction | | Oxidation | Residual Pd | Pd | Co-oxidant/ AC/DW solution[d] | |
|---|---|---|---|---|---|---|---|---|---|---|---|
| | TSC | AC[b] | DW[c] | | Temp. | time | Co- | Pd | extraction | | |
| Sample ID | (%)[e] | (g) | (g) | (g) | (°C.) | (hrs) | Headspace | oxidant | (ppm) | (%) | (g) | wt (%) |
| Example 39 | 12.7 | 1000 | 0.200 | 6.67 | 0.0073 | 50 | 5 | N2 | CuCl2 | 17.4 | 58.9 | 6.87 | 2.9 |
| Example 40 | 12.7 | 1000 | 0.200 | 6.67 | 0.0146 | 50 | 5 | 2 vol % O2 | CuCl2 | 16.1 | 61.9 | 6.88 | 2.9 |

[a]Zetpol 2010 cement: Hydrogenated nitrile rubber-acetone solution having 12.7% of solid content, 36% of acrylonitrile and 95% of hydrogenation (Zeon Chemicals LP)
[b]AC: Ammonium Chloride: $NH_4Cl$ - Insoluble in acetone and soluble in water (26.7 wt % at RT)
[c]DW: Deionized water
[d]AC/DW solution (wt %): Ammonium chloride (%) in ammonium chloride aqueous solution by weight
[e]TSC (%): Total solid content during catalyst extraction step Example 41-45

Figure 5:
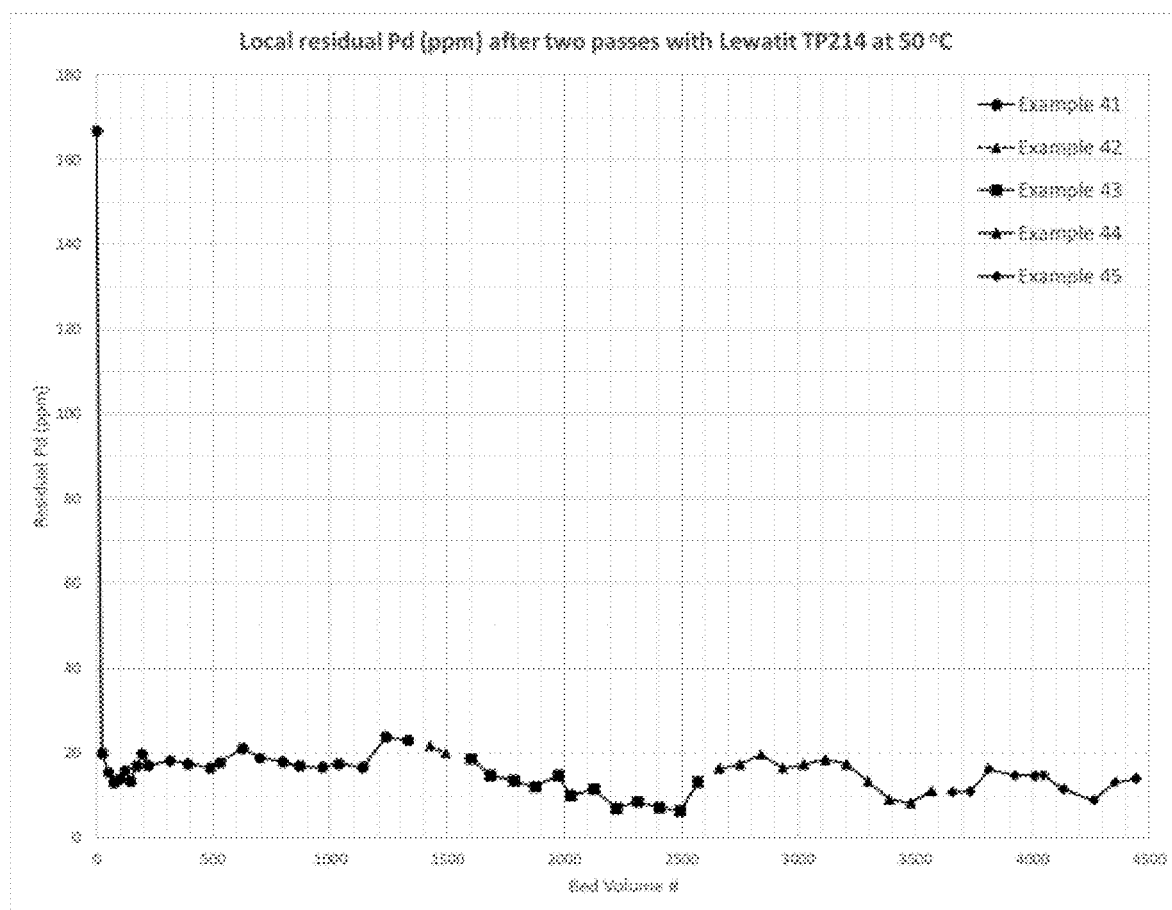
FIG. 5 is a graph of the local residual palladium in hydrogenated nitrile rubbers passed the column after Pd extraction step with 4-10% of HNBR solution and 0.5-2.0 BV/hr of flow rate at 50° C. (example 41-45).

In Example 41-45, two columns having 1.02 cm of diameter and 12 cm of length (L/D=12) after packing the column with Lewatit Monoplus TP214 (Thiourea functional PS-DVB microporous ion exchange resin, bead size=0.55 f 0.05 mm) which was manufactured from Lanxess were connected to separate palladium-ammonia complex and to extract palladium with thiourea functional group located in pores and the surface of ion exchange resin beads. The temperature was maintained to 50° C. to reduce the viscosity of HNBR-acetone solution and to improve the separation and extraction of palladium complexes. The flow rate was changed from 2.0 BV/hr to 0.5 BV/hr to maximize the separation/extraction efficiency of palladium complex depending on 4% of Zetpol 2000L cement, 8% of Zetpol 2000L cement, 10% of Zetpol 2000L cement, and 8% of Zetpol 4300 cement. FIG. 2 was shown the column conditions and the connection with Pd extraction part. Pd extracted Zetpol cements were used from Example 5 for 4% of Zetpol 2000L, Example 8 for 8% of Zetpol 2000L, Example 11 for 10% of Zetpol 2000L, and Example 23 for Zetpol 4300 cement. After passing two columns, an excess amount of water was added to coagulate the polymer. After filtering and drying the completely coagulated polymer, the residual palladium was measured by using ICP (Inductively Coupled Plasma Argon Emission Spectroscopy). The residual palladiums of the dried HNBR polymers and the palladium extraction efficiencies of the dried HNBR polymer are shown in Table 8 and FIG. 5. Residual palladium in HNBR polymers after Pd extraction were reduced 19.7 ppm with 1 BV/hr for 1330 bed volumes (BVs) of 4% of Zetpol 2000L cement, 17.6 ppm with 2 BV/hr for 160 BVs of 4% of Zetpol 2000L cement, 29.0 ppm with 0.5 BV/hr for 8% of 1078 BVs of Zetpol 2000L cement, 14.2 ppm with 0.5 BV/hr for 10% of 1000 BVs of zetpol 2000L cement, and 32.0 ppm with 0.5 BV/hr for 875 BVs of Zetpol 4300 cement. Pd extraction efficiencies after passing the column were 88.7% with 1 BV/hr for 4% of Zetpol 2000L cement, 87.5% with 2 BV/hr for 4% of Zetpol 2000L cement, 91.5% with 0.5 BV/hr for 8% of Zetpol 2000L cement, 89.0% with 0.5 BV/hr for 10% of Zetpol 2000L cement, and 91.2% with 0.5 BV/hr for 8% of Zetpol 4300 cement. Total Pd extraction efficiency of Zetpol cements without cleaning ion-exchange resins for 4443 BVs was 89.9%. After separating Pd extracted TP 214 resins from the columns, the separated and extracted palladium in the resin was 26283.6 ppm. The resin efficiency for thiourea functional group in ion-exchange resins was 74.7%

TABLE 8

Column recovery with catalyst extraction step

| | | Pd extraction | | | | Column recovery | | | | | |
|---|---|---|---|---|---|---|---|---|---|---|---|
| Sample ID | HNBR grade | HNBR cement TSC (%) | Pd extraction step Scale-up | Residual Pd (ppm) | Pd extraction (%) | Temp. (°C.) | Flow rate (BV/hr) | # BV | Residual Pd (ppm) | Pd recovery (%) | Pd in HNBR (ppm) |
| Example 41 | Zetpol 2000L | 4.0 | Example 5 | 38.5 | 76.9 | 50 | 1.0 | 1330 | 18.8 | 88.7 | 166.9 |
| Example 42 | Zetpol 2000L | 4.0 | Example 5 | 38.5 | 76.9 | 50 | 2.0 | 160 | 20.9 | 87.5 | 166.9 |
| Example 43 | Zetpol 2000L | 8.0 | Example 8 | 40.6 | 70.1 | 50 | 0.5 | 1078 | 11.6 | 91.5 | 136.0 |
| Example 44 | Zetpol 2000L | 10.0 | Example 11 | 29.1 | 78.6 | 50 | 0.5 | 1000 | 14.9 | 89.0 | 136.0 |
| Example 45 | Zetpol 4300 | 8.0 | Example 23 | 44.4 | 68.4 | 50 | 0.5 | 875 | 12.4 | 91.2 | 140.3 |

Example 46

In Example 46, one column having 1.02 cm of diameter and 29 cm of length (L/D=28.8) after packing the column with Lewatit Monoplus TP214 (Thiourea functional PS-DVB microporous ion exchange resin, bead size=0.55±0.05 mm) which was manufactured from Lanxess were connected to separate palladium-ammonia complex and to extract palladium with thiourea functional group located in pores and the surface of ion exchange resin beads. The temperature was maintained to 40° C. to reduce the viscosity of HNBR-acetone solution and to improve the separation and extraction of palladium complexes. The flow rate was fixed to 0.5 BV/hr to maximize the separation/extraction efficiency of palladium complex for 13.5% of Zetpol 2000L cement. FIG. 3 was shown the column conditions and the connection with Pd extraction part. Pd extracted Zetpol cement was used from Example 16 for 13.5% of Zetpol 2000L. After passing one column, an excess amount of water was added to coagulate the polymer. After filtering and drying the completely coagulated polymer, the residual palladium was measured by using ICP (Inductively Coupled Plasma Argon Emission Spectroscopy). The residual palladium of the dried HNBR polymer and the palladium extraction efficiency of the dried HNBR polymer is shown in Table 9. Residual palladium in HNBR polymer after Pd extraction was reduced 25.8 ppm with 0.5 BV/hr for 30 bed volumes (BVs) of 13.5% of Zetpol 2000L cement. Pd extraction efficiency after passing the column was 88.0%.

TABLE 9

Column recovery with catalyst extraction step

| | | Pd extraction | | | Column recovery | | | | | |
|---|---|---|---|---|---|---|---|---|---|---|
| Sample ID | HNBR grade | HNBR cement TSC (%) | Pd extraction step Scale-up | Residual Pd (ppm) | Pd extraction (%) | Temperature (° C.) | Flow rate (BV/hr) | # BV | Residual Pd (ppm) | Pd recovery (%) | Pd in HNBR (ppm) |
| Example 46 | Zetpol 2000L | 13.5 | Example 16 | 40.8 | 67.3 | 40 | 0.5 | 30 | 15.0 | 88.0 | 124.6 |

Example 47-53

In Example 47-53, one column having 1.02 cm of diameter and 29 cm of length (L/D=28.8) after packing the column with Lewatit Monoplus TP214 (Thiourea functional PS-DVB microporous ion exchange resin, bead size=0.55±0.05 mm) which was manufactured from Lanxess were connected to separate palladium-ammonia complex and to extract palladium with thiourea functional group located in pores and the surface of ion exchange resin beads. The temperature was maintained to 40° C. to reduce the viscosity of HNBR-acetone solution and to improve the separation and extraction of palladium complexes. The flow rate was fixed to 0.5 BV/hr to maximize the separation/extraction efficiency of palladium complex for 13.5% of Zetpol 2000L cement. FIG. 3 was shown the column conditions and the connection with Pd extraction part. Pd extracted Zetpol cements were used from Example 27-33 for 13.5% of Zetpol 2000L. After passing one column, an excess amount of water was added to coagulate the polymer. After filtering and drying the completely coagulated polymer, the residual palladium was measured by using ICP (Inductively Coupled Plasma Argon Emission Spectroscopy). The residual palladiums of the dried HNBR polymer and the palladium extraction efficiencies of the dried HNBR polymers are shown in Table 10. Residual palladium in HNBR polymer after Pd extraction was reduced 20.8-43.7 ppm with 0.5 BV/hr for 16-30 bed volumes (BVs) of 13.5% of Zetpol 2000L cement depending on oxidation/Pd extraction conditions. Pd extraction efficiencies after passing the column was 80.9-93.8%.

TABLE 10

Column recovery with catalyst extraction step

| | | | Pd extraction | | | | | Column recovery | | | | |
|---|---|---|---|---|---|---|---|---|---|---|---|---|
| Sample ID | HNBR grade | ZP 2000L cement TSC (%) | Pd extraction step Scale-up | Oxidation Headspace | Oxidation Comment | Residual Pd (ppm) | Pd extraction (%) | Temp. (° C.) | Flow rate BV/hr | # BV | Residual Pd (ppm) | Pd recovery (%) |
| Example 47 | Zetpol 2000L | 13.5 | Example 27 | Air | 60° C. | 41.6 | 66.6 | 40 | 0.5 | 30 | 15.0 | 88.0 |
| Example 48 | Zetpol 2000L | 13.5 | Example 28 | Air | FeCl3 | 47.2 | 62.1 | 40 | 0.5 | 27 | 13.4 | 89.3 |
| Example 49 | Zetpol 2000L | 13.5 | Example 29 | N2 | FeCl3 | 55.2 | 55.7 | 40 | 0.5 | 23 | 11.5 | 90.8 |
| Example 50 | Zetpol 2000L | 13.5 | Example 30 | N2 | CuCl2 | 38.9 | 68.8 | 40 | 0.5 | 25 | 7.7 | 93.8 |
| Example 51 | Zetpol 2000L | 13.5 | Example 31 | N2 | CuCl2 | 33.0 | 73.5 | 40 | 0.5 | 16 | 12.2 | 90.2 |
| Example 52 | Zetpol 2000L | 13.5 | Example 32 | 2 vol % O2 | headspace | 47.2 | 62.1 | 40 | 0.5 | 17 | 19.4 | 84.5 |
| Example 53 | Zetpol 2000L | 13.5 | Example 33 | 2 vol % O2 | Bubbling | 57.5 | 53.9 | 40 | 0.5 | 22 | 23.8 | 80.9 |

Comparative Example 1

Figure 6:
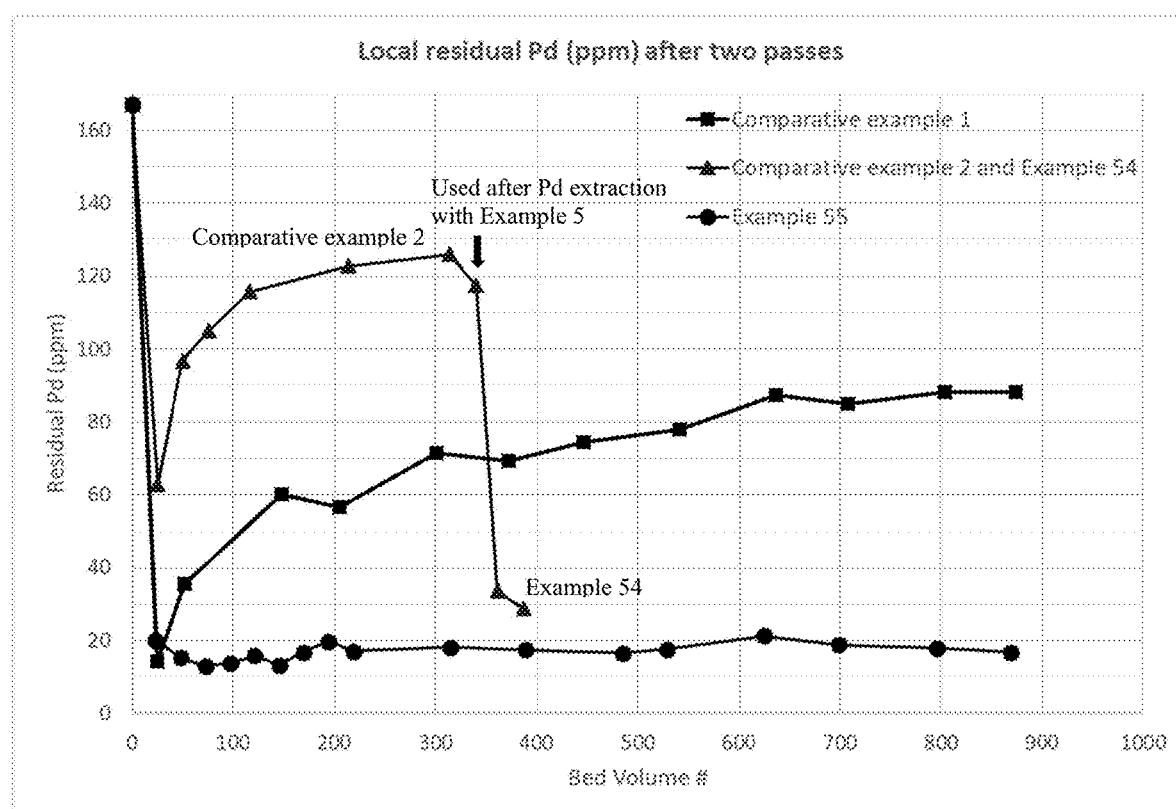
FIG. 6 is a graph of the local residual palladium in hydrogenated nitrile rubbers passed the column without Pd extraction step (comparative example 1 and 2) and after Pd extraction step (example 54 and 55).

In Comparative Example 1, two columns having 1.02 cm of diameter and 12 cm of length (L/D=12) after packing the column with MP-Thiourea-Fine (Thiourea functional PS-DVB microporous ion exchange resin, bead size=100-200 mesh) which was manufactured from Supra Sciences was used without Pd extraction step. The temperature was maintained to 50° C. to reduce the viscosity of HNBR-acetone solution and to improve the separation and extraction of palladium complexes. The flow rate was fixed to 1.0 BV/hr to maximize the separation/extraction efficiency of palladium for 4% of Zetpol 2000L cement. FIG. 2 was shown the column conditions except Pd extraction step. After passing two columns, an excess amount of water was added to coagulate the polymer. After filtering and drying the completely coagulated polymer, the residual palladium was measured by using ICP (Inductively Coupled Plasma Argon Emission Spectroscopy). The residual palladiums of the dried HNBR polymers and the palladium extraction efficiencies of the dried HNBR polymer are shown in Table 11 and FIG. 6. Residual palladiums in HNBR polymers without Pd extraction were increased from 14.4 ppm to 87.3 ppm after 637 BVs and maintained with 88.0 ppm up to 874 BVs. Pd extraction efficiencies after passing the column were decreased from 91.4% to 47.3% depending on time and bed volume numbers (BVs).

TABLE 11

Column recovery without catalyst extraction step: Comparative example 1

| | Sample ID | | | | | | | | | | | | |
|---|---|---|---|---|---|---|---|---|---|---|---|---|---|
| | CE 1-1 | CE 1-2 | CE 1-3 | CE 1-4 | CE 1-5 | CE 1-6 | CE 1-7 | CE 1-8 | CE 1-9 | CE 1-10 | CE 1-11 | CE 1-12 | CE 1-13 |
| Column (D) (cm) | | 1.02 | 1.02 | 1.02 | 1.02 | 1.02 | 1.02 | 1.02 | 1.02 | 1.02 | 1.02 | 1.02 | 1.02 |
| Column (L) (cm) | | 12 | 12 | 12 | 12 | 12 | 12 | 12 | 12 | 12 | 12 | 12 | 12 |
| Bed volume (BV) (ml) | | 10.0 | 10.0 | 10.0 | 10.0 | 10.0 | 10.0 | 10.0 | 10.0 | 10.0 | 10.0 | 10.0 | 10.0 |
| Receiving time (hr) | 0 | 25 | 27 | 96 | 57 | 96 | 72 | 74 | 94 | 96 | 70 | 96 | 70 |
| Total receiving time (hr) | 0 | 25 | 52 | 148 | 205 | 301 | 373 | 447 | 541 | 637 | 707 | 803 | 873 |
| BV/hr | | 1.0 | 1.0 | 1.0 | 1.0 | 1.0 | 1.0 | 1.0 | 1.0 | 1.0 | 1.0 | 1.0 | 1.0 |
| Bed volume numbers | 0 | 25 | 27 | 96 | 57 | 96 | 72 | 74 | 94 | 96 | 71 | 96 | 70 |
| Total bed volume numbers | 0 | 25 | 52 | 148 | 205 | 301 | 373 | 447 | 541 | 637 | 708 | 804 | 874 |
| Pd-extracted ZP cement (g) | | 198 | 213 | 758 | 450 | 758 | 569 | 585 | 743 | 758 | 557 | 758 | 553 |
| Pd-extracted ZP cement (ml) | | 250 | 270 | 960 | 570 | 960 | 720 | 740 | 940 | 960 | 705 | 960 | 700 |
| Jacket T (° C.) | 52 | 52 | 52 | 52 | 52 | 52 | 52 | 52 | 52 | 52 | 52 | 52 | 52 |
| Residual Pd in HNBR (ppm) | 166.9 | 14.4 | 35.7 | 60.0 | 56.7 | 71.4 | 69.3 | 74.5 | 77.8 | 87.3 | 84.9 | 88.0 | 88.0 |
| Recovery of Pd (%) | 0 | 91.4 | 78.6 | 64.1 | 66.0 | 57.2 | 58.5 | 55.4 | 53.4 | 47.7 | 49.1 | 47.3 | 47.3 |

Comparative Example 2 and Example 54

In Comparative Example 2 and Example 54, two columns having 1.02 cm of diameter and 12 cm of length (L/D=12) after packing the column with MP-Thiourea-Fine (Thiourea functional PS-DVB microporous ion exchange resin, bead size=100-200 mesh) which was manufactured from Supra Sciences for the first column and A501P (Type I, Macroporous Polystyrene ion-exchange resin, bead size=300-1200 μm) which was manufactured from was used Purolite for the second column. The temperature was maintained to 50° C. to reduce the viscosity of HNBR-acetone solution and to improve the separation and extraction of palladium. The flow rate was fixed to 1.0 BV/hr to maximize the separation/extraction efficiency of palladium for 4% of Zetpol 2000L cement. FIG. 2 was shown the column conditions except Pd extraction step for Comparative Example 2 and with Pd extraction step (Example 5) for Example 54. 4% of Zetpol 2000L cement was passed the columns up to 341 BVs for Comparative Example 2 and then 4% of Pd extracted Zetpol 2000L cement (Example 5) was passed continuously from 342 BVs to 388 BVs. After passing two columns, an excess amount of water was added to coagulate the polymer. After filtering and drying the completely coagulated polymer, the residual palladium was measured by using ICP (Inductively Coupled Plasma Argon Emission Spectroscopy). The residual palladiums of the dried HNBR polymers and the palladium extraction efficiencies of the dried HNBR polymer are shown in Table 12 and FIG. 6. Residual palladiums in HNBR polymers without Pd extraction (Comparative Example 2) were increased from 62.9 ppm to 126.0 ppm after 314 BVs. Residual palladiums in HNBR polymers after Pd extraction step (Example 54) were decreased suddenly to 33.7 ppm for 21 BVs and then decreased continuously to 28.8 ppm for 26 BVs. Pd extraction efficiencies after passing the column were changed from 62.3% to 24.5% for 314 BVs of Comparative Example 2 and then from 79.8% to 82.7% for 47 BVs of Example 54.

TABLE 12

Column recovery: Comparative example 2 (without catalyst extraction step) and example 54 (with catalyst extraction step)

| | Sample ID | | | | | | | | |
|---|---|---|---|---|---|---|---|---|---|
| | CE 2-1 | CE 2-2 | CE 2-3 | CE 2-4 | CE 2-5 | CE 2-6 | CE 2-7 | Ex 54-1 | Ex 54-2 |
| Column (D) (cm) | 1.02 | 1.02 | 1.02 | 1.02 | 1.02 | 1.02 | 1.02 | 1.02 | 1.02 |
| Column (L) (cm) | 12 | 12 | 12 | 12 | 12 | 12 | 12 | 12 | 12 |
| Bed volume (BV) (ml) | 10.0 | 10.0 | 10.0 | 10.0 | 10.0 | 10.0 | 10.0 | 10.0 | 10.0 |
| Receiving time (hr) | 0 | 25 | 25 | 25 | 41 | 97 | 100 | 27 | 21 | 26 |
| Total receiving time (hr) | 0 | 25 | 50 | 75 | 116 | 213 | 313 | 340 | 361 | 387 |
| BV/hr | | 1.0 | 1.0 | 1.0 | 1.0 | 1.0 | 1.0 | 1.0 | 1.0 | 1.0 |
| Bed volume numbers | 0 | 25 | 25 | 26 | 41 | 97 | 100 | 27 | 21 | 26 |
| Total bed volume numbers | 0 | 25 | 50 | 76 | 117 | 214 | 314 | 341 | 362 | 388 |
| Pd-extracted ZP cement (g) | | 198 | 198 | 202 | 324 | 766 | 790 | 213 | 166 | 205 |
| Pd-extracted ZP cement (ml) | | 250 | 250 | 256 | 410 | 970 | 1000 | 270 | 210 | 260 |
| Jacket T (° C.) | 52 | 52 | 52 | 52 | 52 | 52 | 52 | 52 | 52 | 52 |
| Residual Pd in HNBR (ppm) | 166.9 | 62.9 | 96.8 | 105.0 | 115.8 | 122.7 | 126.0 | 117.4 | 33.7 | 28.8 |
| Recovery of Pd (%) | 0 | 62.3 | 42.0 | 37.1 | 30.6 | 26.5 | 24.5 | 29.7 | 79.8 | 82.7 |

Example 55

In Example 55, two columns having 1.02 cm of diameter and 12 cm of length (L/D=12) after packing the column with MP-Thiourea-Fine (Thiourea functional PS-DVB microporous ion exchange resin, bead size=100-200 mesh) which was manufactured from Supra Sciences for the first column and A501P (Type I, Macroporous Polystyrene ion-exchange resin, bead size=300-1200 μm) which was manufactured from was used Purolite for the second column. The temperature was maintained to 50° C. to reduce the viscosity of HNBR-acetone solution and to improve the separation and extraction of palladium complexes. The flow rate was fixed to 1.0 BV/hr to maximize the separation/extraction efficiency of palladium complex for 4% of Zetpol 2000L cement. FIG. 2 was shown the column conditions and the connection with Pd extraction part. Pd extracted Zetpol cement was used from Example 5 for 4% of Zetpol 2000L. After passing two columns, an excess amount of water was added to coagulate the polymer. After filtering and drying the completely coagulated polymer, the residual palladium was measured by using ICP (Inductively Coupled Plasma Argon Emission Spectroscopy). The residual palladiums of the dried HNBR polymers and the palladium extraction efficiencies of the dried HNBR polymer are shown in Table 13 and FIG. 6. Residual palladium in HNBR polymers after Pd extraction were slightly decreased from 20.0 ppm to 16.9 ppm for 868 BVs of 4% of Zetpol 2000L cement. Pd extraction efficiencies after passing the column were from 88.0% to 89.9% for 868 BVs of 4% of Pd extracted Zetpol 2000L cement without changing Pd extraction efficiencies depending on BVs.

TABLE 13

Column recovery with catalyst extraction step: Example 55

| Sample ID | Ex 55-1 | Ex 55-2 | Ex 55-3 | Ex 55-4 | Ex 55-5 | Ex 55-6 | Ex 55-7 | Ex 55-8 | Ex 55-9 |
|---|---|---|---|---|---|---|---|---|---|
| Column (D) (cm) | 1.02 | 1.02 | 1.02 | 1.02 | 1.02 | 1.02 | 1.02 | 1.02 | 1.02 |
| Column (L) (cm) | 12 | 12 | 12 | 12 | 12 | 12 | 12 | 12 | 12 |
| Bed volume (BV) (ml) | 10.0 | 10.0 | 10.0 | 10.0 | 10.0 | 10.0 | 10.0 | 10.0 | 10.0 |
| Receiving time (hr) | 0 | 23.0 | 25.0 | 25.0 | 25.0 | 23.5 | 24.0 | 24.0 | 24.4 | 25.0 |
| Total receiving time (hr) | 0 | 23 | 48 | 73 | 98 | 122 | 146 | 170 | 194 | 219 |
| BV/hr | | 1.0 | 1.0 | 1.0 | 1.0 | 1.0 | 1.0 | 1.0 | 1.0 | 1.0 |
| Bed volume numbers | 0 | 23.0 | 25.0 | 25.0 | 25.0 | 23.5 | 24.0 | 24.0 | 24.4 | 25.0 |
| Total bed volume numbers | 0 | 23 | 48 | 73 | 98 | 122 | 146 | 170 | 194 | 219 |
| Pd-extracted ZP cement (g) | | 182 | 198 | 198 | 198 | 186 | 190 | 190 | 193 | 198 |
| Pd-extracted ZP cement (ml) | | 230 | 250 | 250 | 250 | 235 | 240 | 240 | 244 | 250 |
| Jacket T (° C.) | 52 | 52 | 52 | 52 | 52 | 52 | 52 | 52 | 52 |
| Residual Pd in HNBR (ppm) | 166.9 | 20.0 | 15.4 | 13.0 | 13.9 | 15.9 | 13.3 | 16.9 | 19.8 | 17.1 |
| Recovery of Pd (%) | 0 | 88.0 | 90.8 | 92.2 | 91.7 | 90.5 | 92.0 | 89.9 | 88.1 | 89.8 |

| Sample ID | Ex 55-10 | Ex 55-11 | Ex 55-12 | Ex 55-13 | Ex 5514 | Ex 55-15 | Ex 55-16 | Ex 55-17 |
|---|---|---|---|---|---|---|---|---|
| Column (D) (cm) | 1.02 | 1.02 | 1.02 | 1.02 | 1.02 | 1.02 | 1.02 | 1.02 |
| Column (L) (cm) | 12 | 12 | 12 | 12 | 12 | 12 | 12 | 12 |
| Bed volume (BV) (ml) | 10.0 | 10.0 | 10.0 | 10.0 | 10.0 | 10.0 | 10.0 | 10.0 |
| Receiving time (hr) | 96.0 | 75.0 | 95.0 | 44.0 | 96.0 | 74.5 | 96.0 | 73.0 |
| Total receiving time (hr) | 315 | 390 | 485 | 529 | 625 | 699 | 795 | 868 |
| BV/hr | 1.0 | 1.0 | 1.0 | 1.0 | 1.0 | 1.0 | 1.0 | 1.0 |
| Bed volume numbers | 96.0 | 75.0 | 95.0 | 44.0 | 96.0 | 74.5 | 96.0 | 73.0 |
| Total bed volume numbers | 315 | 390 | 485 | 529 | 625 | 699 | 795 | 868 |
| Pd-extracted ZP cement (g) | 758 | 593 | 751 | 348 | 758 | 589 | 758 | 577 |
| Pd-extracted ZP cement (ml) | 960 | 750 | 950 | 440 | 960 | 745 | 960 | 730 |
| Jacket T (° C.) | 52 | 52 | 52 | 52 | 52 | 52 | 52 | 52 |
| Residual Pd in HNBR (ppm) | 18.2 | 17.5 | 16.5 | 17.7 | 21.3 | 18.9 | 17.9 | 16.9 |
| Recovery of Pd (%) | 89.1 | 89.5 | 90.1 | 89.4 | 87.2 | 88.7 | 89.3 | 89.9 |

Example 56

In Example 56 a fully hydrogenated acrylonitrile-butadiene rubber solution (ZETPOL 2000L cement from Zeon Chemicals LP) was made with heterogeneous catalyst (silica-supported palladium) in acetone. After finishing the hydrogenation with heterogeneous catalyst under hydrogen in high pressure, most of palladium was recovered by using silica supported state. After fully coagulation with excess amount of water and drying, 162.40 ppm of residual palladium was existed in the fully hydrogenated acrylonitrile-butadiene rubber. 1000 g of Zetpol 2000L cement having 162.40 ppm of residual palladium and 13.5% of solid by weight was placed in 2.5 liter of a glass jar attached with an agitator. In another beaker, 0.20 g of ammonium chloride, 6.59 g of deionized water, and 0.078 g of 3% hydrogen peroxide aqueous solution (mol ratio of hydrogen peroxide/palladium in rubber=0.34) was mixed to make 6.87 g of hydrogen peroxide/ammonium chloride/water solution (HP/AC/DW solution). 6.87 g of HP/AC/DW solution was added at room temperature to the 13.5% of Zetpol 2000L cement and then it was heated to 50° C. under nitrogen. After heating the reactor temperature to 50° C., the oxidation/catalyst extraction step was conducted for 5 hours. At the end of the oxidation/catalyst extraction step, after cooling the reactor to room temperature, and then an excess amount of water was added to make the complete coagulation. After filtering and drying the completely coagulated polymer, the residual palladium was measured by using ICP (Inductively Coupled Plasma Argon Emission Spectroscopy). The residual palladium of the dried HNBR polymer (Zetpol 2000L) was 71.7 ppm and the palladium extraction efficiency of the dried HNBR polymer was 55.8%. The results are shown in Table 14.

Example 57 was prepared according to the same procedure as Example 56 except different amount of hydrogen peroxide aqueous solution. 0.3% of hydrogen peroxide aqueous solution was 0.39 g (mol ratio of hydrogen peroxide/palladium in rubber=1.7) instead of 0.34 g. After the catalyst extraction step, an excess amount of water was added to coagulate the polymer. After filtering and drying the completely coagulated polymer, the residual palladium was measured by using ICP (Inductively Coupled Plasma Argon Emission Spectroscopy). The residual palladium of the dried HNBR polymer (Zetpol 2000L) was 52.2 ppm and the palladium extraction efficiency of the dried HNBR polymer was 67.9%. The results are shown in Table 14.

Example 58 was prepared according to the same procedure as Example 56 except different amount of hydrogen peroxide aqueous solution. 0.3% of hydrogen peroxide aqueous solution was 0.78 g (mol ratio of hydrogen peroxide/palladium in rubber=3.4) instead of 0.34 g. After the catalyst extraction step, an excess amount of water was added to coagulate the polymer. After filtering and drying the completely coagulated polymer, the residual palladium was measured by using ICP (Inductively Coupled Plasma Argon Emission Spectroscopy). The residual palladium of the dried HNBR polymer (Zetpol 2000L) was 49.0 ppm and the palladium extraction efficiency of the dried HNBR polymer was 69.8%. The results are shown in Table 14.

Example 59 was prepared according to the same procedure as Example 56 except different amount of hydrogen peroxide aqueous solution. 0.3% of hydrogen peroxide aqueous solution was 1.16 g (mol ratio of hydrogen peroxide/palladium in rubber=5.1) instead of 0.34 g. After the catalyst extraction step, an excess amount of water was added to coagulate the polymer. After filtering and drying the completely coagulated polymer, the residual palladium was measured by using ICP (Inductively Coupled Plasma Argon Emission Spectroscopy). The residual palladium of the dried HNBR polymer (Zetpol 2000L) was 51.5 ppm and the palladium extraction efficiency of the dried HNBR polymer was 68.3%. The results are shown in Table 14.

Example 60 was prepared according to the same procedure as Example 56 except different amount of hydrogen peroxide aqueous solution. 0.3% of hydrogen peroxide aqueous solution was 1.55 g (mol ratio of hydrogen peroxide/palladium in rubber=6.8) instead of 0.34 g. After the catalyst extraction step, an excess amount of water was added to coagulate the polymer. After filtering and drying the completely coagulated polymer, the residual palladium was measured by using ICP (Inductively Coupled Plasma Argon Emission Spectroscopy). The residual palladium of the dried HNBR polymer (Zetpol 2000L) was 48.8 ppm and the palladium extraction efficiency of the dried HNBR polymer was 70.0%. The results are shown in Table 14.

Example 61 was prepared according to the same procedure as Example 56 except different amount of hydrogen peroxide aqueous solution. 0.3% of hydrogen peroxide aqueous solution was 1.94 g (mol ratio of hydrogen peroxide/palladium in rubber=8.4) instead of 0.34 g. After the catalyst extraction step, an excess amount of water was added to coagulate the polymer. After filtering and drying the completely coagulated polymer, the residual palladium was measured by using ICP (Inductively Coupled Plasma Argon Emission Spectroscopy). The residual palladium of the dried HNBR polymer (Zetpol 2000L) was 42.5 ppm and the palladium extraction efficiency of the dried HNBR polymer was 73.8%. The results are shown in Table 14.

Example 62 was prepared according to the same procedure as Example 56 except total solid content of Zetpol 2000L cement and different amount of hydrogen peroxide aqueous solution. 741 g of Zetpol 2000L cement having 162.4 ppm of residual palladium and 13.5% of solid by weight was placed in 2.5 liter of a glass jar attached with an agitator. 259 g of acetone was added to the Zetpol 2000L cement and it was stirred for a homogeneous state. The total solid content was 10% by weight. 0.3% of hydrogen peroxide aqueous solution was 0.78 g (mol ratio of hydrogen peroxide/palladium in rubber=4.6) instead of 0.34 g. After the catalyst extraction step, an excess amount of water was added to coagulate the polymer. After filtering and drying the completely coagulated polymer, the residual palladium was measured by using ICP (Inductively Coupled Plasma Argon Emission Spectroscopy). The residual palladium of the dried HNBR polymer (Zetpol 2000L) was 27.5 ppm and the palladium extraction efficiency of the dried HNBR polymer was 83.1%. The results are shown in Table 14.

TABLE 14

Pd extraction step

| Sample ID | Zetpol 2000L cement[a] TSC (%)[g] | (g) | AC[b] (g) | DW[c] (g) | HP solution[d] (g) | Temp./time (° C./hrs) | Head space | Oxidation Comment | HP/Pd[e] (mol ratio) | Pd in HNBR (ppm) | Pd extraction (%) | HP/AC/DW solution[f] (g) | DW (wt %/ZP cement) |
|---|---|---|---|---|---|---|---|---|---|---|---|---|---|
| Example 56 | 13.5 | 1000 | 0.200 | 6.59 | 0.078 | 50/5 | N2 | H2O2 | 0.34 | 71.7 | 55.8 | 6.87 | 0.67 |
| Example 57 | 13.5 | 1000 | 0.200 | 6.29 | 0.39 | 50/5 | N2 | H2O2 | 1.7 | 52.2 | 67.9 | 6.88 | 0.67 |
| Example 58 | 13.5 | 1000 | 0.200 | 5.91 | 0.78 | 50/5 | N2 | H2O2 | 3.4 | 49.0 | 69.8 | 6.89 | 0.67 |
| Example 59 | 13.5 | 1000 | 0.200 | 5.54 | 1.16 | 50/5 | N2 | H2O2 | 5.1 | 51.5 | 68.3 | 6.90 | 0.67 |
| Example 60 | 13.5 | 1000 | 0.200 | 5.16 | 1.55 | 50/5 | N2 | H2O2 | 6.8 | 48.8 | 70.0 | 6.91 | 0.67 |
| Example 61 | 13.5 | 1000 | 0.200 | 4.78 | 1.94 | 50/5 | N2 | H2O2 | 8.4 | 42.5 | 73.8 | 6.92 | 0.67 |
| Example 62 | 10.0 | 1000 | 0.200 | 4.24 | 0.78 | 50/5 | N2 | H2O2 | 4.6 | 27.5 | 83.1 | 5.22 | 0.50 |

[a]Zetpol 2000L cement: Hydrogenated nitrile rubber-acetone solution having 13.1% of solid content, 36% of acrylonitrile hydrogenation (Zeon Chemicals LP)
[b]AC: Ammonium Chloride: $NH_4Cl$ - Insoluble in acetone and soluble in water (26.7 wt % at RT)
[c]DW: Deionized water
[d]HP solution: 3% by weight of hydrogen peroxide in aqueous solution
[e]HP/Pd: Mol ratio of hydrogen peroxide based on palladium
[f]HP/AC/DW solution: Hydrogen peroxide, Ammonium chloride, and deionized water solution
[g]TSC (%): Total solid content during catalyst extraction step Example 63-69

In Example 63-69, one having 1.02 cm of diameter and 29 cm of length (L/D=28.8) after packing the column with Lewatit Monoplus TP214 (Thiourea functional PS-DVB microporous ion exchange resin, bead size=0.55±0.05 mm) which was manufactured from Lanxess were connected to separate palladium-ammonia complex and to extract palladium with thiourea functional group located in pores and the surface of ion exchange resin beads. The temperature was maintained to 40° C. to reduce the viscosity of HNBR-acetone solution and to improve the separation and extraction of palladium complexes. The flow rate was fixed to 0.5 BV/hr to maximize the separation/extraction efficiency of palladium complex for 13.5% and 10% of Zetpol 2000L cement. FIG. 3 was shown the column conditions and the connection with Pd extraction part. Pd extracted Zetpol cements were used from Example 56-62 for 13.5% and 10% of Zetpol 2000L cement. After passing one column, an excess amount of water was added to coagulate the polymer. After filtering and drying the completely coagulated polymer, the residual palladium was measured by using ICP (Inductively Coupled Plasma Argon Emission Spectroscopy). The residual palladiums of the dried HNBR polymer and the palladium extraction efficiencies of the dried HNBR polymers are shown in Table 15. Residual palladium in HNBR polymer after Pd extraction was reduced to 9.2-17.6 ppm with 0.5 BV/hr for 9-15 bed volumes (BVs) of 13.5% of Zetpol 2000L cement and 11.2 ppm with 0.5 BV/hr for 14 bed volumes of 10% of Zetpol 2000L cement depending on oxidation/Pd extraction conditions. Pd extraction efficiencies after passing the column was 89.2-94.3%.

TABLE 15

Column recovery with catalyst extraction step

| Sample ID | HNBR grade | Oxidation/Pd extraction step | | | | | | | Column recovery step | | | | |
|---|---|---|---|---|---|---|---|---|---|---|---|---|---|
| | | ZP 2000L cement TSC (%) | Pd extraction step | HP/Pd[a] (mol ratio) | Oxidation Head space | Oxidation Comment | Residual Pd (ppm) | Pd extraction (%) | Flow rate (BV/hr) | Temp. (° C.) | BV# | Residual Pd (ppm) | Pd recovery (%) |
| Example 63 | Zetpol 2000L | 13.5 | Example 56 | 0.34 | N2 | H2O2 | 71.7 | 55.8 | 0.5 | 40.0 | 9 | 17.6 | 89.2 |
| Example 64 | Zetpol 2000L | 13.5 | Example 57 | 1.7 | N2 | H2O2 | 52.2 | 67.9 | 0.5 | 40.0 | 14 | 11.7 | 92.8 |
| Example 65 | Zetpol 2000L | 13.5 | Example 58 | 3.4 | N2 | H2O2 | 49.0 | 69.8 | 0.5 | 40.0 | 14 | 11.4 | 93.0 |
| Example 66 | Zetpol 2000L | 13.5 | Example 59 | 5.1 | N2 | H2O2 | 51.5 | 68.3 | 0.5 | 40.0 | 15 | 11.0 | 93.2 |
| Example 67 | Zetpol 2000L | 13.5 | Example 60 | 6.8 | N2 | H2O2 | 48.8 | 70.0 | 0.5 | 40.0 | 14 | 10.0 | 93.8 |
| Example 68 | Zetpol 2000L | 13.5 | Example 61 | 8.4 | N2 | H2O2 | 42.5 | 73.8 | 0.5 | 40.0 | 14 | 9.2 | 94.3 |
| Example 69 | Zetpol 2000L | 10.0 | Example 62 | 4.6 | N2 | H2O2 | 27.5 | 83.1 | 0.5 | 40.0 | 14 | 11.2 | 93.1 |

Example 70

A partially hydrogenated acrylonitrile-butadiene rubber (HNBR) solution was made with homogeneous catalyst (palladium acetate) in acetone using reduction at 15° C. for 1 hour and then hydrogenation at 55° C. for 6 hours under 718 psi of hydrogen pressure. Hydrogenation degree of the HNBR was 87% for 10% of TSC and 90% for 5% of TSC. After fully coagulation with excess amount of water and drying, residual palladium in the partially hydrogenated acrylonitrile-butadiene rubber was existed 480.9 ppm for 10% of TSC and 575.7 ppm for 5% of TSC. 252 g of 10% of solid by weight of HNBR cement having 480.9 ppm of residual palladium was placed in 1 liter of a glass jar attached with an agitator. In another beaker, 0.025 g of ammonium chloride, 0.87 g of deionized water, and 0.40 g of 3% hydrogen peroxide aqueous solution (mol ratio of hydrogen peroxide/palladium in rubber=3.10 for 10% of TSC and 5.18 for 5% of TSC) was mixed to make 1.30 g of hydrogen peroxide/ammonium chloride/water solution (HP/AC/DW solution). 1.30 g of HP/AC/DW solution was added at room temperature to the HNBR cements and then it was heated to 55° C. under nitrogen. After heating the reactor temperature to 55° C., the oxidation/catalyst extraction step was conducted for 6 hours. At the end of the oxidation/catalyst extraction step, after cooling the reactor to room temperature, and then an excess amount of water was added to make the complete coagulation. After filtering and drying the completely coagulated polymer, the residual palladium was measured by using ICP (Inductively Coupled Plasma Argon Emission Spectroscopy). The residual palladium of the dried HNBR polymer was 130.8 ppm for 10% of TSC and 53.1 ppm for 5% of TSC and the palladium extraction efficiency of the dried HNBR polymer was 72.8% for 10 5 of TSC and 90.8% for 5% of TSC.

One having 1.02 cm of diameter and 29 cm of length (L/D=28.8) after packing the column with Lewatit Monoplus TP214 (Thiourea functional PS-DVB microporous ion exchange resin, bead size=0.55±0.05 mm) which was manufactured from Lanxess were connected to separate palladium-ammonia complex and to extract palladium with thiourea functional group located in pores and the surface of ion exchange resin beads. The temperature was maintained to 40° C. to reduce the viscosity of HNBR-acetone solution and to improve the separation and extraction of palladium complexes. The flow rate was fixed to 0.5 BV/hr to maximize the separation/extraction efficiency of palladium complex for 10% of HNBR cement. FIG. 3 was shown the column conditions and the connection with Pd extraction part. After passing one column, an excess amount of water was added to coagulate the polymer. After filtering and drying the completely coagulated polymer, the residual palladium was measured by using ICP (Inductively Coupled Plasma Argon Emission Spectroscopy). Residual palladium in HNBR polymer after Pd extraction was reduced to 40.6-45.4 ppm with 0.5 BV/hr for 8 bed volumes (BVs) of 10% of HNBR cement and 19.3-22.9 ppm with 0.5 BV/hr for 8 bed volumes of 5% of HNBR cement. Pd extraction efficiencies after passing the column was 90.6-91.6% for 10% of TSC and 96.0-96.6% for 5% of TSC.

What is claimed is:
1. A process for recovering residual heterogeneous or homogeneous catalyst from hydrogenated nitrile rubber solution comprising the steps of:
(1) a catalyst extraction step with an ammonium salt and water,
(2) an optional oxidation step before and/or during the catalyst extraction step, and
(3) a separation/column recovery step with a column packed with functional ion exchange resin for catalyst recovery of the extracted catalyst;
wherein the ammonium salt in the catalyst extraction step is:

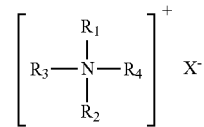

where $R_1$, $R_2$, $R_3$, and $R_4$, are independently selected from hydrogen and alkyl, and X is selected from chloride, bromide, iodide, and acetate.

2. The process of claim 1, wherein the residual heterogeneous or homogeneous catalyst in the hydrogenated nitrile rubber comprises a metal selected from palladium, platinum, rhodium, and ruthenium.

3. The process of claim 1, wherein the hydrogenated nitrile rubber solution in the extraction step with ammonium salts and water has from about 1% to about 20% by weight hydrogenated nitrile rubber.

4. The process of claim 1, wherein the hydrogenated nitrile rubber solution in the extraction step with ammonium salts and water has from about 4% to about 15% by weight hydrogenated nitrile rubber.

5. The process of claim 1, wherein the oxidizing agent for the oxidation step before and/or during the catalyst extraction step is oxygen mixed with inert gas.

6. The process of claim 1, wherein the oxidizing agent for the oxidation of the catalyst before and/or during the catalyst extraction step is selected from iron (III) chloride, iodine, hydrogen peroxide, copper (II) chloride, copper (II) acetate, benzoquinone, tert-butyl hydroperoxide, and combinations thereof.

7. The process of claim 1, wherein the ammonium salt is selected from ammonium chloride, ammonium bromide, ammonium iodide, ammonium acetate, and combinations thereof.

8. The process of claim 1, wherein the amount of the ammonium salt in the catalyst extraction step is less than 2% by weight of the hydrogenated nitrile rubber.

9. The process of claim 1, wherein the amount of water in the extraction step is less than 5% by weight of the hydrogenated nitrile rubber solution.

10. The process of claim 1, wherein the functional groups in the functional ion exchange resins for packing the column is selected from thiourea, thiouronium, thiol, amine, diamine, triamine, TMT, dithiocarbamate, carbodithioate, and combinations thereof.

11. The process of claim 1, wherein the average particle diameter of the functional ion exchange resin ranges from about 0.07 mm to about 1.50 mm.

12. The process of claim 1, wherein the nitrile rubber is selected from acrylonitrile-butadiene copolymer, acrylonitrile-acrylate-butadiene terpolymer, and combinations thereof.

13. A process for recovering residual heterogeneous or homogeneous catalyst from hydrogenated nitrile rubber solution comprising the steps of:
(1) a catalyst extraction step with an ammonium salt and water, (2) an optional oxidation step before and/or during the catalyst extraction step, and (3) a separation/column recovery step with a column packed with functional ion exchange resin for catalyst recovery of the extracted catalyst;

wherein the amount of the ammonium salt in the catalyst extraction step is less than 2% by weight of the hydrogenated nitrile rubber.

14. The process of claim 13, wherein the residual heterogeneous or homogeneous catalyst in the hydrogenated nitrile rubber comprises a metal selected from palladium, platinum, rhodium, and ruthenium.

15. The process of claim 13, wherein the hydrogenated nitrile rubber solution in the extraction step with ammonium salts and water has from about 1% to about 20% by weight hydrogenated nitrile rubber.

16. The process of claim 13, wherein the oxidizing agent for the oxidation step before and/or during the catalyst extraction step is oxygen mixed with inert gas.

17. The process of claim 13, wherein the oxidizing agent for the oxidation of the catalyst before and/or during the catalyst extraction step is selected from iron (III) chloride, iodine, hydrogen peroxide, copper (II) chloride, copper (II) acetate, benzoquinone, tert-butyl hydroperoxide, and combinations thereof.

18. The process of claim 13, wherein the ammonium salt is selected from ammonium chloride, ammonium bromide, ammonium iodide, ammonium acetate, and combinations thereof.

19. The process of claim 13, wherein the amount of water in the extraction step is less than 5% by weight of the hydrogenated nitrile rubber solution.

20. The process of claim 13, wherein the functional groups in the functional ion exchange resins for packing the column is selected from thiourea, thiouronium, thiol, amine, diamine, triamine, TMT, dithiocarbamate, carbodithioate, and combinations thereof.

21. The process of claim 13, wherein the average particle diameter of the functional ion exchange resin ranges from about 0.07 mm to about 1.50 mm.

22. The process of claim 13, wherein the nitrile rubber is selected from acrylonitrile-butadiene copolymer, acrylonitrile-acrylate-butadiene terpolymer, and combinations thereof.

23. A process for recovering residual heterogeneous or homogeneous catalyst from hydrogenated nitrile rubber solution comprising the steps of:

(1) a catalyst extraction step with an ammonium salt and water, (2) an optional oxidation step before and/or during the catalyst extraction step, and (3) a separation/column recovery step with a column packed with functional ion exchange resin for catalyst recovery of the extracted catalyst;

wherein the amount of water in the extraction step is less than 5% by weight of the hydrogenated nitrile rubber solution.

24. The process of claim 23, wherein the residual heterogeneous or homogeneous catalyst in the hydrogenated nitrile rubber comprises a metal selected from palladium, platinum, rhodium, and ruthenium.

25. The process of claim 23, wherein the hydrogenated nitrile rubber solution in the extraction step with ammonium salts and water has from about 1% to about 20% by weight hydrogenated nitrile rubber.

26. The process of claim 23, wherein the oxidizing agent for the oxidation step before and/or during the catalyst extraction step is oxygen mixed with inert gas.

27. The process of claim 23, wherein the oxidizing agent for the oxidation of the catalyst before and/or during the catalyst extraction step is selected from iron (III) chloride, iodine, hydrogen peroxide, copper (II) chloride, copper (II) acetate, benzoquinone, tert-butyl hydroperoxide, and combinations thereof.

28. The process of claim 23, wherein the ammonium salt is selected from ammonium chloride, ammonium bromide, ammonium iodide, ammonium acetate, and combinations thereof.

29. The process of claim 23, wherein the amount of water in the extraction step is less than 5% by weight of the hydrogenated nitrile rubber solution.

30. The process of claim 23, wherein the functional groups in the functional ion exchange resins for packing the column is selected from thiourea, thiouronium, thiol, amine, diamine, triamine, TMT, dithiocarbamate, carbodithioate, and combinations thereof.

31. The process of claim 23, wherein the average particle diameter of the functional ion exchange resin ranges from about 0.07 mm to about 1.50 mm.

32. The process of claim 23, wherein the nitrile rubber is selected from acrylonitrile-butadiene copolymer, acrylonitrile-acrylate-butadiene terpolymer, and combinations thereof.

* * * * *